(12) United States Patent
Araki et al.

(10) Patent No.: US 9,902,279 B2
(45) Date of Patent: Feb. 27, 2018

(54) FOREIGN-MATTER-REMOVING DEVICE, GROUND EQUIPMENT FOR WIRELESS POWER-SUPPLYING SYSTEM, AND WIRELESS POWER-SUPPLYING SYSTEM

(71) Applicant: IHI CORPORATION, Tokyo (JP)

(72) Inventors: Jun Araki, Tokyo (JP); Motonao Niizuma, Tokyo (JP); Susumu Tokura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/337,036

(22) Filed: Oct. 28, 2016

(65) Prior Publication Data

US 2017/0043672 A1 Feb. 16, 2017

Related U.S. Application Data

(63) Continuation of application No. PCT/JP2015/068334, filed on Jun. 25, 2015.

(30) Foreign Application Priority Data

Jun. 30, 2014 (JP) ................. 2014-134535
Sep. 8, 2014 (JP) ................. 2014-182510
Sep. 8, 2014 (JP) ................. 2014-182528

(51) Int. Cl.
| | |
|---|---|
| *H02J 17/00* | (2006.01) |
| *B60L 11/18* | (2006.01) |
| *H02J 7/00* | (2006.01) |
| *B60S 1/48* | (2006.01) |
| *H02J 7/02* | (2016.01) |
| *B60M 7/00* | (2006.01) |

(Continued)

(52) U.S. Cl.
CPC ......... *B60L 11/1824* (2013.01); *B60L 11/182* (2013.01); *B60M 7/003* (2013.01); *B60S 1/482* (2013.01); *B60S 1/52* (2013.01); *B60S 1/56* (2013.01); *B60S 5/06* (2013.01); *H02J 7/00* (2013.01); *H02J 7/025* (2013.01); *H02J 50/60* (2016.02); *B60L 2270/147* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/124* (2013.01); *Y02T 90/14* (2013.01)

(58) Field of Classification Search
CPC ..... B60L 11/1824; B60L 11/182; H02J 50/60; H02J 7/00; H02J 7/025; B60M 7/003; B60S 1/482; B60S 1/52; B60S 1/56; B60S 5/06
See application file for complete search history.

(56) References Cited

U.S. PATENT DOCUMENTS

| | | |
|---|---|---|
| 2012/0091993 A1 | 4/2012 | Uramoto et al. |
| 2013/0169062 A1 | 7/2013 | Maikawa et al. |

(Continued)

FOREIGN PATENT DOCUMENTS

| | | |
|---|---|---|
| JP | 2004-328808 A | 11/2004 |
| JP | 2005-152817 A | 6/2005 |

(Continued)

*Primary Examiner* — Daniel Cavallari
(74) *Attorney, Agent, or Firm* — Volpe and Koenig, P.C.

(57) ABSTRACT

A foreign-matter-removing device for a coil device includes a liquid-jetting unit that washes away a foreign matter, which is present in an area through which a magnetic field generated in wireless supply of power using magnetic coupling of a receiving-side pad and a transmitting-side pad passes, by a jet of liquid.

7 Claims, 21 Drawing Sheets

(51) Int. Cl.
*B60S 1/52* (2006.01)
*B60S 1/56* (2006.01)
*B60S 5/06* (2006.01)
*H02J 50/60* (2016.01)

(56) References Cited

U.S. PATENT DOCUMENTS

2013/0175987 A1   7/2013   Amma et al.
2014/0239735 A1   8/2014   Abe et al.

FOREIGN PATENT DOCUMENTS

| | | |
|---|---|---|
| JP | 2011-125184 A | 6/2011 |
| JP | 2011-259649 A | 12/2011 |
| JP | 2012-090374 A | 5/2012 |
| JP | 2012-147634 A | 8/2012 |
| JP | 2012-249401 A | 12/2012 |
| JP | 2013-059239 A | 3/2013 |
| JP | 2013-115915 A | 6/2013 |
| JP | 2013-121209 A | 6/2013 |
| JP | 2013-198357 A | 9/2013 |
| JP | 2013-543719 A | 12/2013 |
| JP | 2014-023296 A | 2/2014 |
| JP | 2014-107915 A | 6/2014 |
| JP | 2014-115027 A | 6/2014 |
| WO | 2012/047779 A1 | 4/2012 |

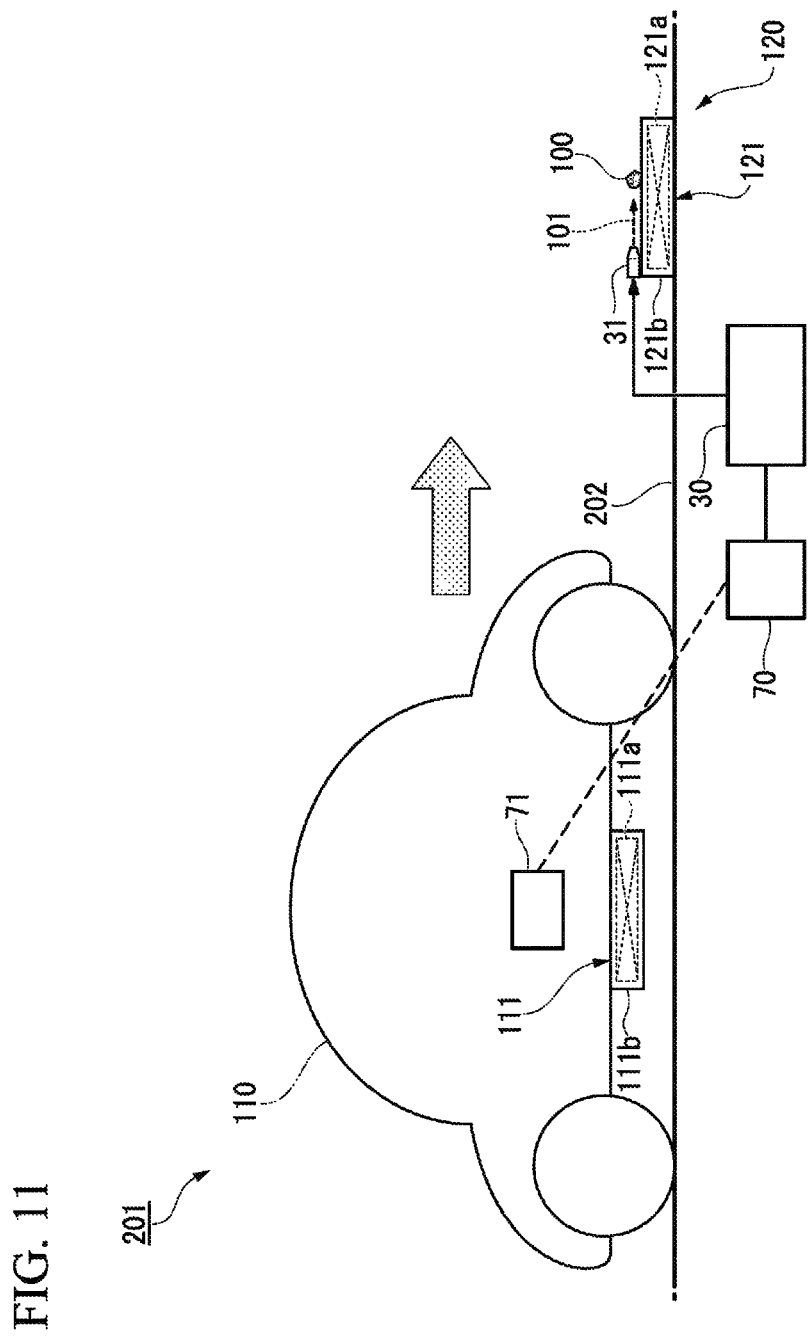

FOREIGN-MATTER-REMOVING DEVICE, GROUND EQUIPMENT FOR WIRELESS POWER-SUPPLYING SYSTEM, AND WIRELESS POWER-SUPPLYING SYSTEM This application is a continuation application based on a PCT Patent Application No. PCT/JP2015/068334, filed on Jun. 25, 2015, whose priority is claimed on Japanese Patent Application No. 2014-134535, filed on Jun. 30, 2014, Japanese Patent Application No. 2014-182510, filed on Sep. 8, 2014, and Japanese Patent Application No. 2014-182528, filed on Sep. 8, 2014. The contents of both the PCT application and the Japanese Patent Application are incorporated herein by reference.

TECHNICAL FIELD

The present disclosure relates to foreign-matter-removing device, a ground equipment for a wireless power-supplying system, and a wireless power-supplying system.

BACKGROUND ART

In recent years, a wireless power-supplying system in which a magnetic field transmitting power is generated between coil devices facing each other and power is supplied from a power-transmitting side to a power-receiving side in a wireless manner has attracted attention. The wireless power-supplying system employs a magnetic resonance system or an electromagnetic induction system, and application thereof to supply power to a movable body such as an electric vehicle or a hybrid vehicle is expected. However, in the wireless power-supplying system, when a foreign matter is in an area through which the magnetic field of the coil devices passes, there is a possibility of magnetic field distribution between the coil devices being affected, a magnetic flux interlinking with the coil device on the power-receiving side decreasing, and power supply efficiency decreasing.

Patent Document 1 discloses a wireless power-receiving device including a cover that covers a coil receiving power supplied from the outside and has a surface involved in electromagnetic induction or magnetic resonance and one or more wipers that wipe the surface. According to the wireless power-receiving device, a foreign matter having a possibility of a bad influence on the receiving of power can be wiped off from the surface of the cover of the coil by operation of the wipers.

Recently, hybrid electric vehicles (HEVs) including an electric motor and an internal combustion engine have been used. Electric vehicles (EVs) including only an electric motor have also been used.

A wireless power-supplying system that supplies power to an electric vehicle or the like in a wireless manner transmits power from a power-transmitting side to a power-receiving side by magnetically coupling a primary coil on the power-transmitting side and a secondary coil on the power-receiving side.

The wireless power-supplying systems are roughly classified into a circular type and a solenoid type.

In a circular type wireless power-supplying system, axes of the primary coil and the secondary coil are both located vertical to the ground. In a solenoid type wireless power-supplying system, the axes of the primary coil and the secondary coil are located parallel to each other.

As a system for wireless power supply, for example, an electromagnetic induction system, a radio wave system, and a magnetic resonance system are known.

The electromagnetic induction system employs electromagnetic induction in which an electromotive force is generated in one of two neighboring coils with a magnetic flux generated by a current flowing in the other coil as a medium.

The radio wave system converts a current into electromagnetic waves and transmits and receives the electromagnetic waves via an antenna.

The magnetic resonance system uses a magnetic flux as a medium similarly to the electromagnetic induction system, but actively uses a resonance phenomenon of an electric circuit to amplify an induced current flowing in a coil.

In the above-mentioned wireless power-supplying system, when an electroconductive foreign material (for example, a metal) is between the primary coil and the secondary coil, a magnetic flux varying over time interlinks with the foreign matter and generates an eddy current, and the temperature of the foreign matter increases due to Joule heat.

A wireless power-supplying system that detects such a foreign matter is disclosed, for example, in Patent Document 2.

A device that removes such a foreign matter is disclosed, for example, in Patent Document 3.

The wireless power-supplying system disclosed in Patent Document 2 is a wireless power-supplying system that employs the above-mentioned electromagnetic induction system, includes a third coil between a first coil and a second coil, and detects a foreign matter between the first coil and the second coil on the basis of an induced voltage generated in the third coil.

In the wireless power-supplying system for a movable body disclosed in Patent Document 3, for example, when a foreign matter detection signal is input from a foreign matter detector, a motor causes two wiper members to rotate 90° to remove a foreign matter on a case of a power-transmitting coil.

In the wireless power-supplying system for a movable body disclosed in Patent Document 3, for example, a foreign matter on a belt conveyor is detected by the foreign matter detector, and a driving roller rotates to cause the belt conveyor covering the top surface of the power-transmitting coil to circulate.

CITATION LIST

Patent Document

[Patent Document 1]
   Japanese Unexamined Patent Application, First Publication No. 2013-121209
[Patent Document 2]
   Japanese Unexamined Patent Application, First Publication No. 2012-249401
[Patent Document 3]
   Japanese Unexamined Patent Application, First Publication No. 2013-59239

SUMMARY OF INVENTION

Technical Problem

An object of the present disclosure is to provide a foreign-matter-removing device, a ground equipment of a wireless power-supplying system, and a wireless power-supplying system, which can remove a foreign matter and different from previous disclosures.

Solution to Problem

According to a first aspect of the present disclosure, a foreign-matter-removing device is provided, including: a liquid-jetting unit that washes a foreign matter away with a jet of liquid in an area through which a magnetic field generated in wireless supply of power using magnetic coupling of coil devices passes.

According to a second aspect of the present disclosure, in the foreign-matter-removing device, the liquid-jetting unit may jet the liquid when the magnetic field is generated.

According to a third aspect of the present disclosure, the foreign-matter-removing device may further include: a liquid-collecting unit that collects the liquid jetted from the liquid-jetting unit; and a liquid supply unit that supplies the liquid collected by the liquid-collecting unit to the liquid-jetting unit.

According to a fourth aspect of the present disclosure, the foreign-matter-removing device may further include: a position-specifying unit that specifies a position of the foreign matter; and a jet angle-adjusting unit that adjusts a jet angle of the liquid on the basis of the specification result of the position-specifying unit.

According to a fifth aspect of the present disclosure, in the foreign-matter-removing device, a groove may be formed in an area of the coil device with which the foreign matter is able to come into contact, and the liquid-jetting unit may jet the liquid along the groove.

According to a sixth aspect of the present disclosure, a ground equipment is provided for a wireless power-supplying system including a coil device, including: the above-mentioned foreign-matter-removing device.

According to a seventh aspect of the present disclosure, in the ground equipment for a wireless power-supplying system, the coil device may include an inclined portion inclined in a gravitational direction in an area with which the foreign matter is able to come into contact.

According to an eighth aspect of the present disclosure, a wireless power-supplying system is provided, including: a ground equipment that includes a coil device; and a movable body that includes a coil device which is able to face the coil device, wherein at least one of the ground equipment and the movable body includes the foreign-matter-removing device according to any one of Claims 1 to 5.

According to a ninth aspect of the present disclosure, in the wireless power-supplying system, the coil device of at least one of the ground equipment and the movable body may include an inclined portion inclined in a gravitational direction in an area with which the foreign matter is able to come into contact.

According to a tenth aspect of the present disclosure, the wireless power-supplying system may further include a control unit that stops the jet of liquid from the foreign-matter-removing device on the basis of a distance between the movable body and the coil device of the ground equipment.

According to an eleventh aspect of the present disclosure, a foreign-matter-removing device is provided for a wireless power-supplying system that supplies power from a power-transmitting coil to a power-receiving coil in a wireless manner, the foreign-matter-removing device including: an electroconductive rod-shaped wiper member that is movable along a top surface of a transmitting-side pad containing the power-transmitting coil; a guide device that guides the wiper member along the top surface; a ring-shaped coil that is disposed in the transmitting-side pad and generates a single-phase alternating current from an alternating magnetic field of the power-transmitting coil; and a current supply control device that directly supplies the single-phase alternating current generated in the ring-shaped coil to the wiper member to cause the wiper member to move along the top surface.

According to a twelfth aspect of the present disclosure, in the foreign-matter-removing device for a wireless power-supplying system, the top surface of the transmitting-side pad may be horizontal, the wiper member may extend horizontally over the top surface of the transmitting-side pad and be horizontally movable forward and backward perpendicularly to an axis thereof, and the guide device may include a linear driving guide that supports both ends of the wiper member and that guides forward and backward movement of both of the ends and a current supply terminal that is disposed at both of the ends and that supplies the single-phase alternating current in an axis direction of the wiper member.

According to a thirteenth aspect of the present disclosure, in the foreign-matter-removing device for a wireless power-supplying system, the current supply control device may supply the single-phase alternating current, which is an alternating current and is synchronized with the transmitting-side pad, to the wiper member and switch the single-phase alternating current between an in-phase and a reversed phase.

According to a fourteenth aspect of the present disclosure, in the foreign-matter-removing device for a wireless power-supplying system, the top surface of the transmitting-side pad may have a truncated cone shape having a high center, the wiper member may extend outward along a ridge of the truncated cone shape from the center of the transmitting-side pad and be horizontally rotatable about the center, and the guide device may include a rotation guide that guides the center of the wiper member to be horizontally rotatable and a current supply terminal that supplies the single-phase alternating current in the axis direction from both ends of the wiper member.

According to a fifteenth aspect of the present disclosure, in the foreign-matter-removing device for a wireless power-supplying system, the top surface of the transmitting-side pad may be horizontal, the wiper member may extend outward in a spiral shape along a ridge of the truncated cone shape from the center of the transmitting-side pad and be horizontally rotatable about the center, and the guide device may include a rotation guide that guides the center of the wiper member to be horizontally rotatable and a current supply terminal that supplies the single-phase alternating current in the axis direction from both ends of the wiper member.

According to a sixteenth aspect of the present disclosure, the foreign-matter-removing device for a wireless power-supplying system may further include a foreign matter detector that detects a foreign matter located on the top surface of the transmitting-side pad, and the current supply control device may supply the single-phase alternating current to the wiper member when the foreign matter detected by the foreign matter detector.

According to a seventeenth aspect of the present disclosure, in the foreign-matter-removing device for a wireless power-supplying system, it is preferable that the foreign matter detector detect a variation in voltage or impedance of the power-transmitting coil, a variation in a magnetic field in the transmitting-side pad, or a variation in temperature due to emission of heat from the foreign matter.

According to an eighteenth aspect of the present disclosure, foreign-matter-removing device is provided for a wireless power-supplying system that supplies power from a power-transmitting coil to a power-receiving coil in a wireless manner, the foreign-matter-removing device including: a flexible sheet that is movable along a top surface of a transmitting-side pad containing the power-transmitting coil; a ring-shaped coil that is disposed in the transmitting-side pad and generates a single-phase alternating current from an alternating magnetic field of the power-transmitting coil; a sheet-moving device that is driven by a single-phase alternating current and moves the sheet along the top surface of the transmitting-side pad; and a current supply control device that supplies the single-phase alternating current generated in the ring-shaped coil to the sheet-moving device and controls the sheet-moving device.

According to a nineteenth aspect of the present disclosure, the foreign-matter-removing device for a wireless power-supplying system may further include a foreign matter detector that detects a foreign matter located on the top surface of the transmitting-side pad, and the current supply control device may cause the sheet-moving device to operate when the foreign matter is detected by the foreign matter detector.

According to a twentieth aspect of the present disclosure, in the foreign-matter-removing device for a wireless power-supplying system, the foreign matter detector may detect a variation in voltage or impedance of the power-transmitting coil, a variation in a magnetic field in the transmitting-side pad, or a variation in temperature due to emission of heat from the foreign matter.

According to a twenty-first aspect of the present disclosure, in the foreign-matter-removing device for a wireless power-supplying system, the sheet-moving device may include: a forward winding roll that is located outside one end of the transmitting-side pad and winds the sheet in a forward winding direction; a reverse winding roll that is located outside the other end of the transmitting-side pad and winds the sheet in a reverse winding direction; and a forward winding motor that rotationally drives the forward winding roll in the forward winding direction with the single-phase alternating current.

According to a twenty-second aspect of the present disclosure, the foreign-matter-removing device for a wireless power-supplying system may further include a reverse winding motor that rotationally drives the reverse winding roll in the reverse winding direction with the single-phase alternating current, and the current supply control device may alternately rotationally drive the forward winding motor and the reverse winding motor.

According to a twenty-third aspect of the present disclosure, in the foreign-matter-removing device for a wireless power-supplying system, the sheet-moving device may include: a downstream roll that is located outside one end of the transmitting-side pad; an upstream roll that is located outside the other end of the transmitting-side pad; and a driving motor that rotationally drives the downstream roll or the upstream roll with the single-phase alternating current, and the sheet may be spanned between the downstream roll and the upstream roll in an endless manner.

According to a twenty-fourth aspect of the present disclosure, in the foreign-matter-removing device for a wireless power-supplying system, the sheet may have an adhesive material, concave-convex portions, corrugated grooves, or hooks on a surface thereof such that the foreign matter hardly slides.

Advantageous Effects of Invention

According to the present disclosure, it is possible to provide a foreign-matter-removing device, a ground equipment of a wireless power-supplying system, and a wireless power-supplying system, which can remove foreign matter and different from previous disclosures.

BRIEF DESCRIPTION OF DRAWINGS

FIG. 11 is a diagram illustrating a configuration of a wireless power-supplying system according to a sixth embodiment of the present disclosure.

DESCRIPTION OF EMBODIMENTS

Hereinafter, embodiments of the present disclosure will be described with reference to the accompanying drawings.

First Embodiment

Figure 1:
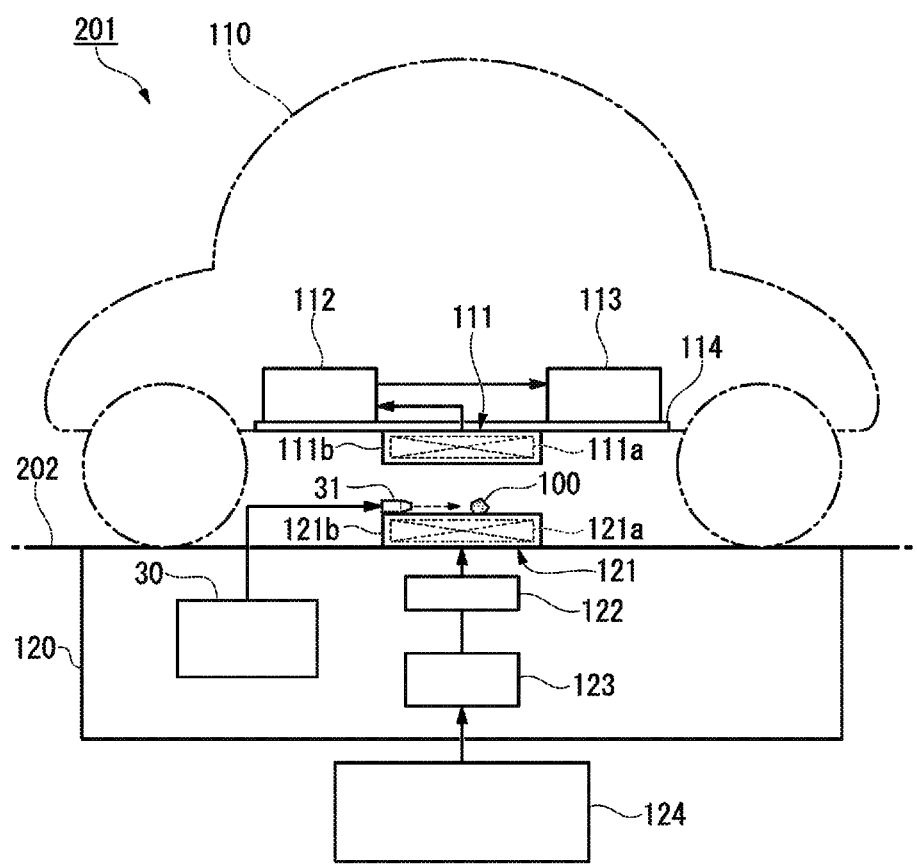
FIG. 1 is a diagram illustrating the entire configuration of a wireless power-supplying system according to a first embodiment of the present disclosure.

FIG. 1 is a diagram illustrating an entire configuration of a wireless power-supplying system 201 according to a first embodiment of the present disclosure.

The wireless power-supplying system 201 performs wireless supply of power between a vehicle 110 (a movable body) and a stop station 120 (ground equipment). In this embodiment, as illustrated in FIG. 1, the vehicle 110 is provided with a power-receiving device, and the stop station 120 in which the vehicle 110 stops is provided with a power-transmitting device. The vehicle 110 is movable relative to the stop station 120 disposed on a road surface 202.

The vehicle 110 is provided with a receiving-side pad 111 (coil device) for receiving power. On the other hand, the stop station 120 is provided with a transmitting-side pad 121 (coil device) for transmitting power. The receiving-side pad 111 is disposed on the bottom of the vehicle 110 so as to face the transmitting-side pad 121 on the ground side. The receiving-side pad 111 includes a coil 111a and receives power in a wireless manner by magnetic coupling to a coil 121a of the transmitting-side pad 121. The receiving-side pad 111 includes a coil 111a and a cover member 111b that covers the coil 111a. The transmitting-side pad 121 includes a coil 121a and a cover member 121b that covers the coil 121a. The cover members 111b and 121b are formed of a nonmagnetic and non-electroconductive material so as not to interfere with a magnetic field which is generated to transmit power in wireless supply of power using magnetic coupling of the coils 111a and 121a. The cover members 111b and 121b are preferably formed of a nonmagnetic and non-electroconductive material, but may have magnetism and electroconductivity.

The wireless supply of power from the transmitting-side pad 121 to the receiving-side pad 111 in the wireless power-supplying system 201 according to this embodiment is implemented using the magnetic coupling of the transmitting-side pad 121 and the receiving-side pad 111 and is carried out on the basis of a magnetic resonance system or an electromagnetic induction system. For example, each of the coil 121a and the coil 111a is connected to a resonance capacitor (not illustrated) constituting a resonance circuit. For example, capacitance of the resonance capacitor is set such that a transmitting-side resonance circuit including the coil 121a and the resonance capacitor and a receiving-side resonance circuit including the coil 111a and the resonance capacitor have the same resonance frequency.

The vehicle 110 is provided with a receiving-side power conversion circuit 112 and a load 113 in addition to the receiving-side pad 111.

The receiving-side power conversion circuit 112 is a power conversion circuit that converts received power, which has been received through the wireless supply of power from the transmitting-side pad 121 by the receiving-side pad 111, into DC power and supplies the DC power to the load 113. That is, the receiving-side power conversion circuit 112 supplies a current corresponding to the load 113 to the load 113. When the load 113 has a DC input, the receiving-side power conversion circuit 112 may include only a rectifier circuit or may additionally include a DC/DC converter. When the load 113 has an AC input, the receiving-side power conversion circuit 112 may have a configuration including an AC/AC exchange function, for example, a configuration including a rectifier circuit, a DC/DC converter, a DC/AC converter, or a matrix converter. The user converter may be of a non-insulated type (such as a chopper) or of an insulated type (such as a transformer).

The load 113 is a power storage device that can store power which is sufficient as a driving power source of the vehicle 110 and is constituted by, for example, a lithium ion secondary battery or a nickel hydrogen secondary battery. The load 113 may be another power storage device (such as a large-capacity capacitor), a resistance-using load (such as a heat-emitting member or an illumination device), an inductance-using load (such as a motor), or the like.

A heat transfer plate 114 is disposed around the receiving-side pad 111. The heat transfer plate 114 is disposed on the back side of the receiving-side pad 111 and supports the receiving-side pad 111. The receiving-side power conversion circuit 112 and the load 113 are disposed on the heat transfer plate 114, and the heat transfer plate 114 is thermally connected to the receiving-side pad 111, the receiving-side power conversion circuit 112, and the load 113. The heat transfer plate 114 is formed of, for example, a metal material such as aluminum or copper having a heat transfer property.

On the other hand, the transmitting-side pad 121 is disposed on the road surface 202 so as to face the receiving-side pad 111. The stop station 120 is provided with a transmitting-side DC-AC conversion circuit 122 and a transmitting-side power conversion circuit 123 in addition to the transmitting-side pad 121. The transmitting-side power conversion circuit 123 is connected to an external power source 124.

The transmitting-side DC-AC conversion circuit 122 is a transmitting-side inverter circuit, includes a circuit such as a half bridge or a full bridge which is generally used, converts DC power from the transmitting-side power conversion circuit 123 into AC power corresponding to the resonance frequency of the wireless supply of power, and supplies the AC power to the coil 121a. The inverter circuit generally employs a method of driving a gate of a semiconductor power device such as a metal-oxide-semiconductor field-effect transistor (MOSFET) or an insulated gate bipolar transistor (IGBT) using a pulse signal and changing a period or a length of the pulse signal to perform pulse width modulation (PWM).

The transmitting-side power conversion circuit 123 is a power conversion circuit that converts power supplied from the external power source 124 into DC power and supplies the DC power to the transmitting-side DC-AC conversion circuit 122. The transmitting-side power conversion circuit 123 may be configured to have an AC/DC conversion function in the case of an AC input. The transmitting-side power conversion circuit 123 may be configured to have a power factor correction (PFC) function in the case of an AC input. The transmitting-side power conversion circuit 123 may be configured to have a DC/DC conversion function in the case of a DC input. The converter to be use may be a non-insulated type (such as a chopper) or an insulated type (such as a transformer).

The external power source 124 may be a commercial power source, a solar battery, a wind power generator, or the like and supplies power thereof to the transmitting-side power conversion circuit 123. When a DC power is input from the external power source 124, the DC input may be connected directly to the transmitting-side DC-AC conversion circuit 122 without using the transmitting-side power conversion circuit 123.

The wireless power-supplying-system 201 includes a foreign-matter-removing device 30 that removes a foreign matter 100 which is present in an area of the transmitting-side pad 121 through which a magnetic field generated in the wireless supply of power passes. The foreign-matter-removing device 30 according to this embodiment is installed in the stop station 120 which is the ground equipment of the wireless power-supplying system 201. The area through which a magnetic field generated in the wireless supply of power is not limited to an area through which a magnetic field actually passes by causing the transmitting-side pad 121 and the receiving-side pad 111 to face each other and starting the wireless supply of power. As described in a sixth embodiment to be described later, this area includes an area in which a magnetic field is not generated yet because the wireless supply of power is not started but through which a magnetic field passes when the wireless supply of power is performed in the future, that is, an area in which a magnetic field can pass.

Figure 2:
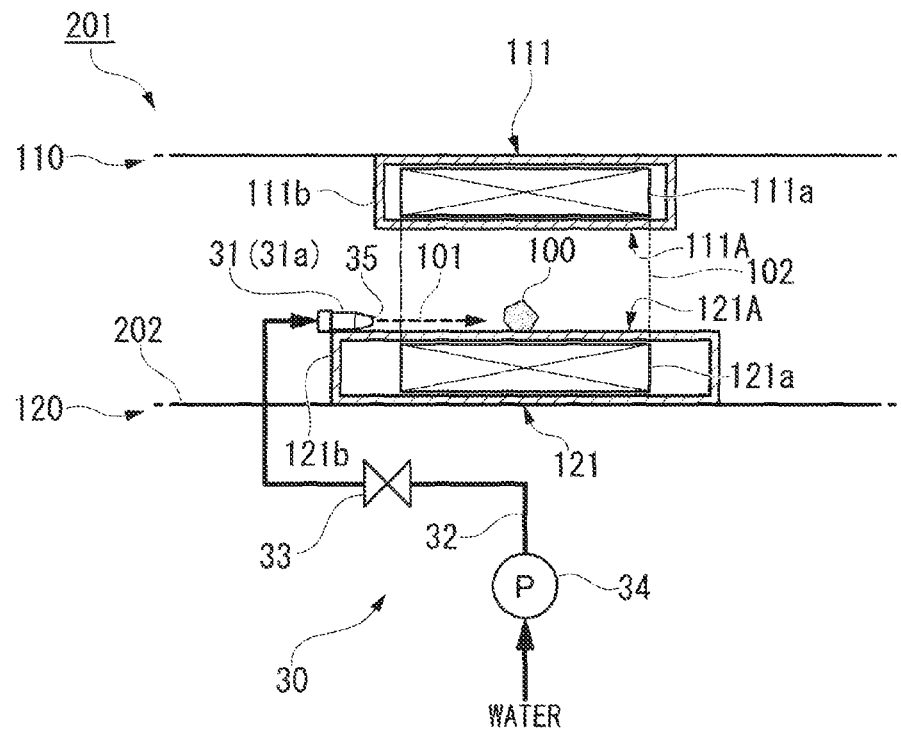
FIG. 2 is a diagram illustrating a configuration of a foreign-matter-removing device according to the first embodiment of the present disclosure.
Figure 3:
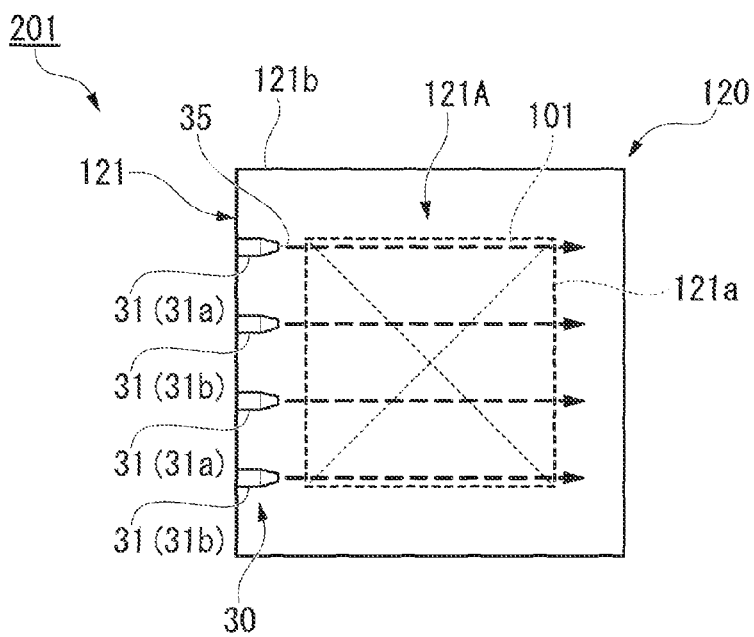
FIG. 3 is a top view illustrating an arrangement of a liquid-jetting member according to the first embodiment of the present disclosure.

FIG. 2 is a diagram illustrating a configuration of the foreign-matter-removing device 30 according to the first embodiment of the present disclosure. FIG. 3 is a top view illustrating an arrangement of a liquid-jetting member 31 according to the first embodiment of the present disclosure.

As illustrated in FIG. 2, the foreign-matter-removing device 30 has a configuration in which a foreign matter 100 is washed away by a jet of liquid 101. The liquid 101 in this embodiment is, for example, tap water. The tap water has non-magnetism and low electroconductivity and hardly affects the wireless supply of power. The liquid 101 may have magnetism and electroconductivity.

As illustrated in FIG. 2, the foreign-matter-removing device 30 is a liquid-jetting unit that jets the liquid 101 and includes a liquid-jetting member 31, a liquid supply line 32, an electromagnetic valve 33, and a pump 34.

A liquid jetting orifice 35 is formed in the liquid-jetting member 31. The liquid-jetting member 31 in this embodiment is a nozzle having the liquid jetting orifice 35 formed at the tip thereof. The liquid-jetting member 31 is a component formed of a nonmagnetic and non-electroconductive material, for example, a resin-molded component, so as not to interfere with a magnetic field for transmitting power in the wireless supply of power. The liquid-jetting member 31 is preferably formed of a nonmagnetic and non-electroconductive, but may have magnetism and electroconductivity.

The liquid-jetting member 31 is disposed on a facing surface 121A among facing surfaces 111A and 121A on which the receiving-side pad 111 and the transmitting-side pad 121 face each other in the wireless supply of power. The liquid jetting orifice 35 is directed to a horizontal direction which is substantially perpendicular to an opposing direction (an up-down direction on the drawing surface of FIG. 2) in which the coils 111a and 121a face each other in the wireless supply of power. The liquid-jetting member 31 is configured to jet the liquid 101 horizontally from the outside of the facing area 102 in which a magnetic field is generated in the wireless supply of power between the coils 111a and 121a and to wash away a foreign matter 100 which is present on the facing surface 121A through which the magnetic field passes by a hydraulic pressure.

As illustrated in FIG. 3, a plurality of liquid-jetting members 31 are disposed on the facing surface 121A. The foreign-matter-removing device 30 according to this embodiment is configured to jet the liquid 101 in at least one of a jet shape and a spray shape and includes, for example, a liquid-jetting member 31a having a liquid jetting orifice 35 that jets the liquid 101 in the jet shape and a liquid-jetting member 31b having a liquid jetting orifice 35 that jets the liquid 101 in the spray shape. The liquid-jetting member 31a and the liquid-jetting member 31b are alternately arranged along the periphery of the cover member 121b, for example, as illustrated in FIG. 3.

As illustrated in FIG. 2, the liquid supply line 32 supplies the liquid 101 to the liquid-jetting members 31. The liquid supply line 32 is branched for each liquid-jetting member 31 downstream. The liquid supply line 32 is provided with the electromagnetic valve 33. The electromagnetic valve 33 opens and closes a flow channel of the liquid supply line 32. The electromagnetic valve 33 includes a metal component, and is thus preferably disposed outside an area (on the transmitting-side pad 121 or in the vicinity thereof) in which a magnetic field is generated in the wireless supply of power between the coils 111a and 121a.

A portion of the liquid supply line 32 entering the area in which a magnetic field is generated is preferably formed of a nonmagnetic and non-electroconductive material, for example, a resin hose, so as not to interfere with the magnetic field for transmitting power in the wireless supply of power. The liquid supply line 32 is connected to the pump 34 upstream. The pump 34 raises the hydraulic pressure of the liquid 101 which is jetted from the liquid-jetting members 31. The pump 34 is connected to, for example, a water supply. The pump 34 may be omitted as long as a hydraulic pressure with which the foreign matter 100 can be washed away can be secured.

The operation of the wireless power-supplying-system 201 having the above-mentioned configuration will be described below.

As illustrated in FIG. 1, the wireless power-supplying-system 201 performs the wireless supply of power between the vehicle 110 and the stop station 120. In the wireless power-supplying-system, since a gap is present between the transmitting-side pad 121 and the receiving-side pad 111, a foreign matter 100 may be interposed therebetween.

When the transmitting-side pad 121 is installed in the stop station 120 of the ground equipment as in this embodiment, a foreign matter 100 may be placed on the facing surface 121A of the transmitting-side pad 121 as illustrated in FIG. 2. In the wireless supply of power, when a foreign matter 100 is present between the transmitting-side pad 121 and the receiving-side pad 111, there is a possibility that a magnetic field distribution will be affected and decrease power supply efficiency. Accordingly, the wireless power-supplying-system 201 includes the foreign-matter-removing device 30 that removes the foreign matter 100 placed between the transmitting-side pad 121 and the receiving-side pad 111.

The foreign-matter-removing device 30 opens the electromagnetic valve 33 and supplies the liquid 101 to the liquid-jetting members 31. The liquid-jetting members 31 are provided with the liquid jetting orifices 35, and the liquid 101 is jetted horizontally along the facing surface 121A of the transmitting-side pad 121 from the liquid jetting orifices 35. The liquid 101 is jetted widely onto the facing surface 121A from the plurality of liquid-jetting members and washes away a foreign matter 100 which is present in the area of the transmitting-side pad 121 through which the magnetic field passes by a hydraulic pressure. The liquid 101 is not worn in spite of contact with the foreign matter 100 unlike the wiper, has a predetermined mass, and thus can easily wash away even a relatively heavy foreign matter 100. Accordingly, the foreign-matter-removing device 30 has a small mechanical movable portion to suppress degradation over time and is not worn due to contact with the foreign matter 100, thereby preventing degradation in removability of the foreign matter 100.

The foreign-matter-removing device 30 jets the liquid 101 in the jet shape and the spray shape. The liquid 101 in the jet shape can be jetted to a target position with high directivity and has a high hydraulic pressure. The jet of the liquid 101 in the jet shape can be suitably used, for example, to wash away a relatively heavy foreign matter 100 (such as a can having contents). The liquid 101 in the spray shape has high diffusibility and can be jetted widely, but has a low hydraulic pressure. The jet of the liquid 101 in the spray shape can be suitably used, for example, to wash away relatively light foreign matter 100 (such as foils). Since the foreign-matter-removing device 30 according to this embodiment simultaneously jets the liquid 101 in the jet shape and the liquid 101 in the spray shape, the foreign-matter-removing device can cover a wide range on the facing surface 121A and can effectively wash foreign matters 100 with various weights.

In this embodiment, the liquid-jetting members 31 have non-magnetism and non-electroconductivity. According to this configuration, the liquid-jetting members 31 does not disturb the magnetic field distribution in the wireless supply of power nor emits heat due to an eddy current (or it is little even if it does). Accordingly, as illustrated in FIG. 2, the liquid-jetting members 31 can be disposed on the facing surface 121A in which the coils 111a and 121a face each other without decreasing efficiency of the wireless supply of power. In this way, by arranging the liquid-jetting members 31 on the facing surface 121A of the transmitting-side pad 121, it is possible to achieve space saving of the foreign-matter-removing device 30.

In this embodiment, the coils 111a and 121a are covered with the nonmagnetic and non-electroconductive cover members 111b and 121b. According to this configuration, the cover members 111b and 121b do not disturb the magnetic field distribution in the wireless supply of power nor emit heat due to an eddy current (or it is little even if it does). Even when the liquid 101 is attached, it is possible to prevent the liquid 101 from reaching the coils 111a and 121a using the cover members 111b and 121b.

In this embodiment, the foreign-matter-removing device 30 jets the liquid 101 when a magnetic field for supplying power is generated between the coils 111a and 121a. The liquid 101 has non-magnetism and non-electroconductivity and hardly affects the wireless supply of power. Accordingly, even when a foreign matter 100 flies in the wireless supply of power, it is possible to remove the foreign matter 100 without affecting the wireless supply of power (without stopping the supply of power). According to this configuration, it is also possible to remove heat generated in the coil 121a by the jet of the liquid 101.

In this way, according to the above-mentioned embodiment, it is possible to remove a foreign matter without using a wiper by employing the foreign-matter-removing device 30 that washes away a foreign matter 100, which is present in the area of the transmitting-side pad 121 through which a magnetic field passes, by the jet of the liquid 101.

A wiper requiring a mechanical movable portion in the related art (see Patent Document 1) has a problem in that the wiper will degrade over time due to abrasion of mechanisms or the like. Since the wiper needs to be brought into strong contact with a cover surface to remove a foreign matter attached to the cover surface, there is a problem in that a removable surface of the wiper is worn due to contact with the foreign matter or friction with the cover and the removal performance of a foreign matter is likely to degrade.

In this embodiment, the foreign matter 100 which is present in the area of the transmitting-side pad 121 (coil device) through which a magnetic field passes is washed away by the jet of the liquid 101. The liquid 101 is not worn in spite of contact with the foreign matter 100 unlike the wiper, has a predetermined mass, and thus can easily wash away even a relatively heavy foreign matter. Since there is a small mechanical movable portion, it is possible to suppress degradation over time, thereby preventing degradation of the removal performance of a foreign matter 100.

Second Embodiment

A second embodiment of the present disclosure will be described below. In the following description, elements equal or equivalent to those in the above-mentioned embodiment will be referenced by the same reference signs and description thereof will be made in brief or will not be repeated.

Figure 4:
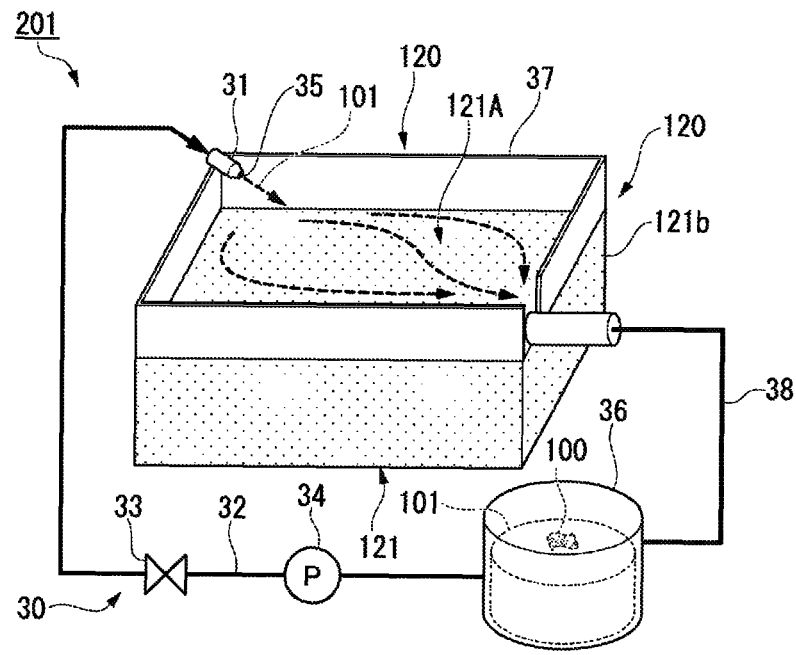
FIG. 4 is a perspective view illustrating a foreign-matter-removing device according to a second embodiment of the present disclosure.

FIG. 4 is a perspective view illustrating a foreign-matter-removing device 30 according to the second embodiment of the present disclosure.

The foreign-matter-removing device 30 according to the second embodiment includes a liquid-jetting member 31 (liquid-jetting unit) that jets liquid 101, a liquid collection tank 36 (liquid-collecting unit) that collects the liquid 101 jetted from the liquid-jetting member 31, and a pump 34 (liquid supply unit) that supplies the liquid 101 collected by the liquid collection tank 36 to the liquid-jetting member 31.

A wall portion 37 with a predetermined height is formed in a peripheral portion of a facing surface 121A of a transmitting-side pad 121 in the second embodiment. The wall portion 37 serves to collect the liquid 101 jetted from the liquid-jetting member 31 and surrounds the facing surface 121A. The liquid-jetting member 31 in the second embodiment is configured to jet the liquid 101 obliquely to the facing surface 121A of the transmitting-side pad 121 from above a corner of the wall portion 37. According to this configuration, the liquid 101 can be wet and spread widely on the facing surface 121A of the transmitting-side pad 121.

A liquid collection line 38 is connected diagonally to the liquid-jetting member 31. The liquid collection line 38 guides the liquid 101 on the facing surface 121A to the liquid collection tank 36.

One end of the liquid collection line 38 is connected to a lower portion of a corner of the wall portion 37 and the other end thereof is connected to an upper portion of the liquid collection tank 36. The liquid collection tank 36 stores the liquid 101 guided from the liquid collection line 38. A foreign matter 100 along with the liquid 101 is guided from the liquid collection line 38.

A liquid supply line 32 is connected to a lower portion of the liquid collection tank 36. According to this configuration, since foreign matter 100 (such as an empty can or a foil) having small specific gravity floats on the liquid 101, it is possible to supply only the liquid 101 to the pump 34. A filter may be disposed in a junction of the liquid supply line 32 or the like so as not to supply a foreign matter 100 to the pump 34. The pump 34 pulls out the liquid 101 stored in the liquid collection tank 36 via the liquid supply line 32 and pressurizes and carries the liquid to the liquid-jetting member 31. When the electromagnetic valve 33 is opened, the pressurized liquid 101 is jetted from the liquid-jetting member 31. Since the liquid-jetting member 31 is disposed above the wall portion 37, a force by which the liquid 101 from the liquid-jetting member 31 is jetted to the facing surface 121A depends on pressing ability of the pump 34 and the gravity. Since the force of the liquid 101 can be realized by the gravity, it is possible to suppress the pressing ability of the pump 34. Accordingly, it is possible to decrease a use load of the pump 34 and to suppress degradation thereof.

According to the second embodiment having the above-mentioned configuration, the liquid 101 jetted from the liquid-jetting member 31 is collected in the liquid collection tank 36 and the liquid 101 collected in the liquid collection tank 36 is jetted again from the liquid-jetting member 31 by the pump 34, thereby causing the liquid to circulate. Accordingly, in the second embodiment, it is possible to reuse the liquid 101 and to contribute to saving of water resources.

Third Embodiment

A third embodiment of the present disclosure will be described below. In the following description, elements equal or equivalent to those in the above-mentioned embodiment will be referenced by the same reference signs and description thereof will be made in brief or will not be repeated.

Figure 5:
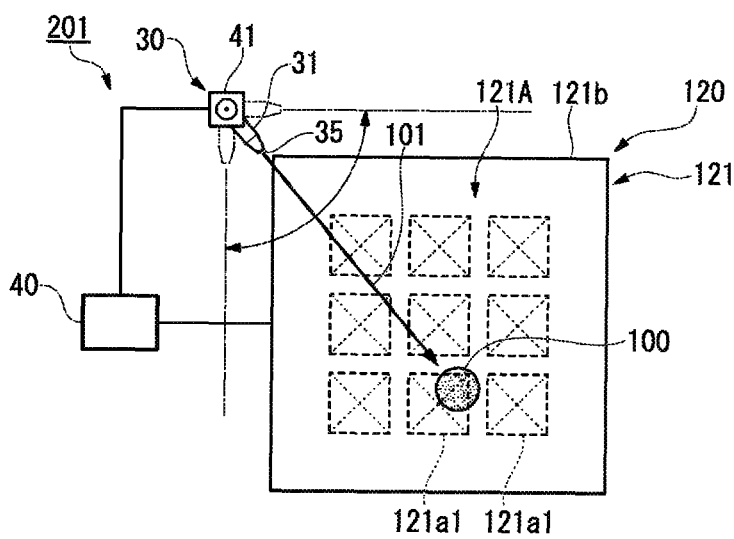
FIG. 5 is a top view illustrating a foreign-matter-removing device according to a third embodiment of the present disclosure.

FIG. 5 is a top view illustrating a foreign-matter-removing device 30 according to the third embodiment of the present disclosure.

The foreign-matter-removing device 30 according to the third embodiment includes a position-specifying unit 40 that specifies a position of a foreign matter 100 in the transmitting-side pad 121 and a jet angle-adjusting unit 41 that adjusts a jet angle of liquid 101 on the basis of the specification result of the position-specifying unit 40.

The transmitting-side pad 121 in the third embodiment is provided with a plurality of detection coils 121a1 other than the power-transmitting coil 121a in a matrix shape. When a magnetic field is generated from the power-transmitting coil 121a, a magnetic flux interlinks with the detection coils 121a1 and a current (induced current) is generated in the detection coils 121a1. The current value is input to the position-specifying unit 40. The position-specifying unit 40 can be constituted by a suitable arbitrary processor such as a central processing unit (CPU) or a digital signal processor (DSP).

When a foreign matter is present, a magnetic flux distribution is affected and thus the magnitude of a current output from the detection coil 121a1 varies depending on the presence of a foreign matter. Accordingly, the position-specifying unit 40 can specify presence of a foreign matter on the basis of the variation of the current from the detection coil 121a1 by grasping a current value when no foreign matter is present in advance. The closer to a foreign matter an area becomes, the larger the variation of the magnetic field distribution becomes. Accordingly, the position-specifying unit 40 can determine that a foreign matter is present around the detection coil 121a1 output from a current having a large variation.

The jet angle-adjusting unit 41 adjusts the direction of the liquid-jetting member 31 on the basis of the specification result of the position-specifying unit 40. The jet angle-adjusting unit 41 includes an angle-adjusting actuator having a motor or the like as a drive source and is configured to adjust a horizontal angle of the liquid-jetting member 31 to jet the liquid to the detection coil 121a1 around which a foreign matter is determined to be present by the position-specifying unit 40. The liquid-jetting member 31 preferably employs a configuration for jetting the liquid 101 in a jet shape to apply a high hydraulic pressure to a target position.

According to the third embodiment having the above-mentioned configuration, the position-specifying unit 40 specifies a position of a foreign matter 100 on the basis of the induced current of the plurality of detection coils 121a1, the jet angle-adjusting unit 41 adjusts the direction of the liquid-jetting member 31 on the basis of the specification result thereof, and the liquid 101 is jetted to the foreign matter 100 on the facing surface 121A to wash away the foreign matter 100. Accordingly, in the third embodiment, it is possible to achieve improvement in accuracy for removal of the foreign matter 100. In the third embodiment, the liquid 101 can be brought into contact with the foreign matter 100 and it is thus possible to contribute saving of water resources.

Fourth Embodiment

A fourth embodiment of the present disclosure will be described below. In the following description, elements equal or equivalent to those in the above-mentioned embodiment will be referenced by the same reference signs and description thereof will be made in brief or will not be repeated.

Figure 6:
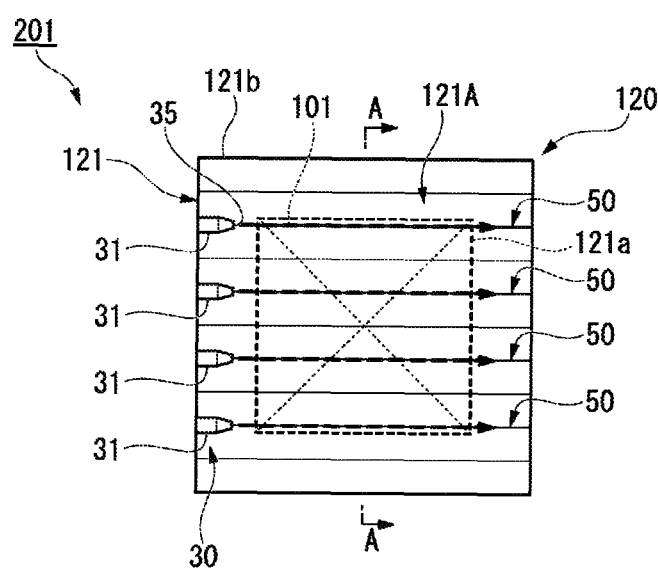
FIG. 6 is a top view illustrating a transmitting-side pad according to a fourth embodiment of the present disclosure.
Figure 7:
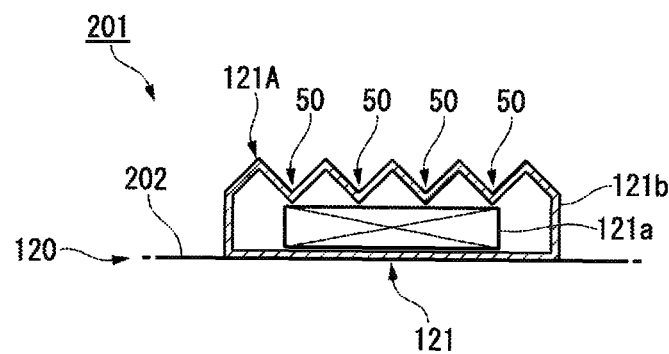
FIG. 7 is a cross-sectional view taken along arrow A-A in FIG. 6.

FIG. 6 is a top view illustrating a transmitting-side pad 121 according to the fourth embodiment of the present disclosure. FIG. 7 is a cross-sectional view taken along arrow A-A in FIG. 6.

In the transmitting-side pad 121 of the fourth embodiment, grooves 50 are formed in an area through which a magnetic field passes and with which a foreign matter can come into contact. The foreign-matter-removing device 30 is configured to jet liquid along the grooves 50.

In the transmitting-side pad 121 of the fourth embodiment, the grooves 50 are formed on the facing surface 121A. As illustrated in FIG. 6, a plurality of grooves 50 are formed in parallel. As illustrated in FIG. 7, the cross-section of each groove 50 has a substantially V shape. As illustrated in FIG. 6, the liquid-jetting member 31 of the foreign-matter-removing device 30 is disposed for each groove 50 and is configured to jet liquid 101 in the extending direction of the grooves 50.

According to the fourth embodiment having the above-mentioned configuration, concave-convex portions can be formed on the facing surface 121A through which a magnetic field passes by forming the grooves 50 in the transmitting-side pad 121. Accordingly, when a foreign matter 100 is supported by a convex portion, the foreign matter 100 comes into linear contact with the convex portion. In this case, a contact area of the facing surface 121A and the foreign matter 100 can be made to be smaller than that when the foreign matter 100 comes into surface contact with the facing surface 121A. Accordingly, even when a foreign matter 100 is adhesive, an adhesive force of the foreign matter 100 to the facing surface 121A is small and it is thus possible to easily wash away the foreign matter 100 with the liquid 101. In the fourth embodiment, since the liquid 101 is jetted along the grooves 50, it is possible to wash away the foreign matter 100 without reducing a force of the liquid 101 because the liquid 101 comes into contact with the surfaces of the grooves 50 and flies.

Figure 8:
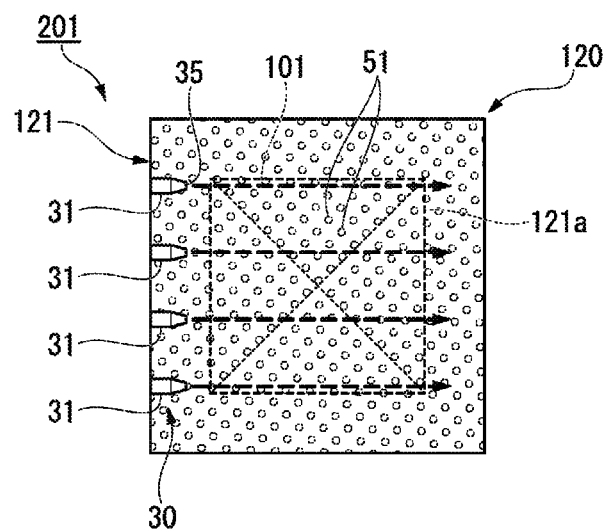
FIG. 8 is a top view illustrating a transmitting-side pad according to a variant example of the fourth embodiment of the present disclosure.
Figure 9:
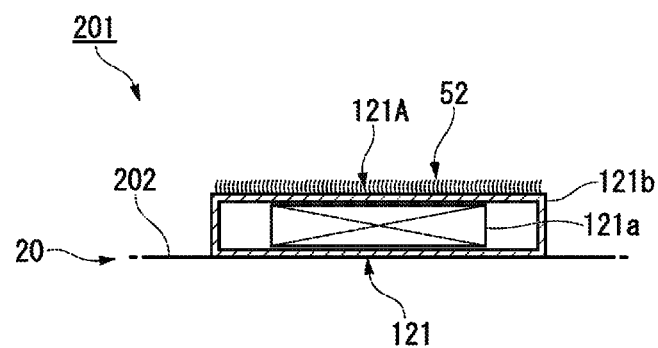
FIG. 9 is a cross-sectional view illustrating the transmitting-side pad according to the variant example of the fourth embodiment of the present disclosure.

Configurations illustrated in FIGS. 8 and 9 may be employed as a variant example of the fourth embodiment.

In the variant example illustrated in FIG. 8, the facing surface 121A of the transmitting-side pad 121 is provided with a plurality of small protrusions 51 (crimped surface). According to this configuration, it is possible to reduce a contact area of a foreign matter 100 and the facing surface 121A.

In the variant example illustrated in FIG. 9, the facing surface 121A of the transmitting-side pad 121 is provided with a plurality of raised naps 52. According to this configuration, it is also possible to reduce a contact area of a foreign matter 100 and the facing surface 121A.

Fifth Embodiment

A fifth embodiment of the present disclosure will be described below. In the following description, elements equal or equivalent to those in the above-mentioned embodiment will be referenced by the same reference signs and description thereof will be made in brief or will not be repeated.

Figure 10:
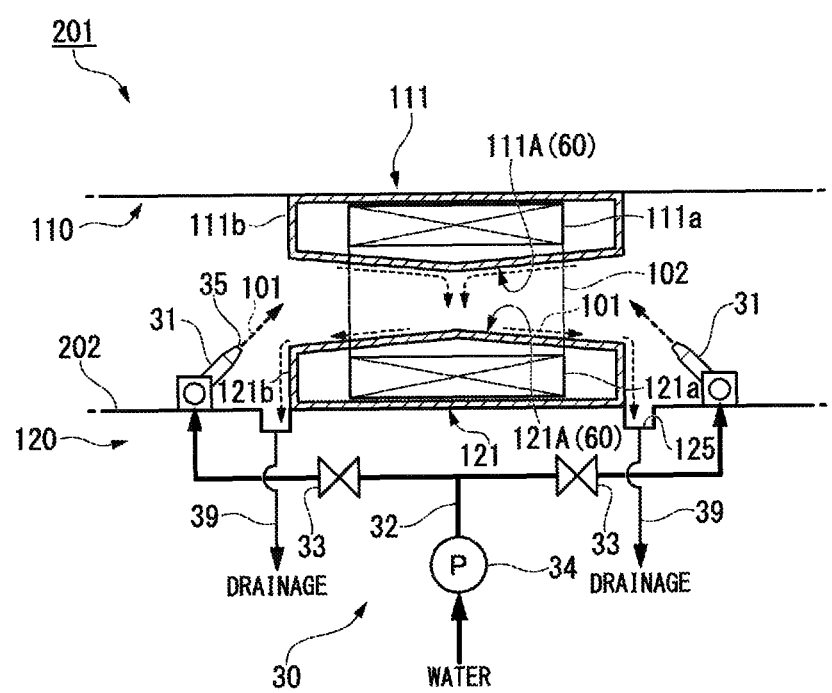
FIG. 10 is a diagram illustrating a configuration of a wireless power-supplying system according to a fifth embodiment of the present disclosure.

FIG. 10 is a diagram illustrating a configuration of a wireless power-supplying system 201 according to the fifth embodiment of the present disclosure.

The wireless power-supplying system 201 according to the fifth embodiment has an inclined portion 60 that is inclined in the gravitational direction in areas of the receiving-side pad 111 and the transmitting-side pad 121 through which a magnetic field passes and with which a foreign matter 100 can come into contact.

The cover member 111b of the receiving-side pad 111 is formed in a mountain shape which is convex downward. Accordingly, the inclined portion 60 that is inclined in the gravitational direction from the periphery to the center (with respect to the horizontal direction) is formed on the facing surface 111A of the receiving-side pad 111. On the other hand, the cover member 121b of the transmitting-side pad 121 is formed in a mountain shape which is convex upward. Accordingly, the inclined portion 60 that is inclined in the gravitational direction from the center to the periphery is formed on the facing surface 121A of the transmitting-side pad 121.

A foreign-matter-removing device 30 according to the fifth embodiment includes a plurality of liquid-jetting members 31 that jet liquid 101 toward the periphery of the receiving-side pad 111. The liquid supply line 32 is branched and connected to the plurality of liquid-jetting members 31, and the branched liquid-jetting members are provided with electromagnetic valves 33, respectively. A drainage groove 125 is formed around the transmitting-side pad 121. A drainage line 39 is connected to the bottom of the drainage groove 125.

According to the fifth embodiment having the above-mentioned configuration, the liquid 101 is jetted from the plurality of liquid-jetting members 31 to the periphery of the facing surface 111A of the receiving-side pad 111. The liquid 101 jetted to the periphery of the facing surface 111A gathers at the center of the facing surface 111A due to the inclined portion 60 and drops to the center of the facing surface 121A of the transmitting-side pad 121. The liquid 101 dropping to the center of the facing surface 121A radially diffuses to the periphery of the facing surface 121A due to the inclined portion 60 and flows down to the drainage groove 125. The liquid 101 flowing down to the drainage groove 125 is drained via the drainage line 39.

According to the fifth embodiment, by jetting the liquid 101 to the periphery of the facing surface 111A of the receiving-side pad 111, the liquid 101 can flow on the facing surface 121A of the transmitting-side pad 121 through which a magnetic field passes as well as the facing surface 111A of the receiving-side pad 111 through which the magnetic field passes. Accordingly, it is possible to remove a foreign matter 100 in contact with the facing surfaces 111A and 121A.

Particularly, since the facing surface 111A is convex downward, the liquid 101 jetted to the facing surface 111A easily gathers in the vicinity of the center of the facing surface 111A, and the liquid 101 is not likely to drop from the facing surface 111A to the outside of the facing surface 121A. Accordingly, the liquid 101 jetted to the facing surface 111A is efficiently used as liquid 101 for removing a foreign matter on the facing surface 121A. By forming the inclined portion 60 on the facing surface 121A of the transmitting-side pad 121 through which a magnetic field passes, it is possible to easily wash away a foreign matter 100 located on the facing surface 121A. According to this configuration, gravity based on an inclination can be used. Even when a jet pressure of the liquid 101 is decreased, it is possible to suppress degradation in removability of a foreign matter 100.

Sixth Embodiment

A sixth embodiment of the present disclosure will be described below. In the following description, elements equal or equivalent to those in the above-mentioned embodiment will be referenced by the same reference signs and description thereof will be made in brief or will not be repeated.

FIG. 11 is a diagram illustrating a configuration of a wireless power-supplying system 201 according to the sixth embodiment of the present disclosure.

The wireless power-supplying system 201 according to the sixth embodiment includes a control unit 70 that stops a jet of liquid 101 in the foreign-matter-removing device 30 on the basis of a distance between a vehicle 110 and the transmitting-side pad 121 of the stop station 120. The distance to the vehicle 110 can be measured with the position of the receiving-side pad 111 or the tip of the vehicle 110 as a reference, and the distance-measuring reference position can be properly set.

The control unit 70 includes a communication unit that wirelessly communicate with a control unit 71 mounted on the vehicle 110, calculates the distance between the vehicle 110 and the transmitting-side pad 121 by communication with the control unit 71, and closes an electromagnetic valve 33 of the foreign-matter-removing device 30 to stop the jet of liquid 101 when the vehicle 110 approaches the transmitting-side pad 121. The control unit 70 includes a central processing unit (CPU), a read only memory (ROM), a random access memory (RAM), and a communication unit and is configured to drive the electromagnetic valve 33 on the basis of a predetermined program.

The control unit 70 stores the position (coordinate) of the transmitting-side pad 121 on the earth in advance. The control unit 71 is connected to a global positioning system (GPS) antenna (not illustrated) mounted on the vehicle 110 and is configured to acquire the position (coordinate) of the vehicle 110 on the earth and to transmit the position of the vehicle 110 to the control unit 70. The control unit 71 includes a central processing unit (CPU), a read only memory (ROM), a random access memory (RAM), and a communication unit. The control unit 70 is programmed to close the electromagnetic valve 33 when the distance between the vehicle 110 and the transmitting-side pad 121 becomes equal to or less than a predetermined threshold value (a distance at which the liquid 101 can reach the vehicle 110).

According to the sixth embodiment having the above-mentioned configuration, the jet of liquid 101 by the foreign-matter-removing device 30 is started to remove a foreign matter 100 before a vehicle 110 to be supplied with power approaches the transmitting-side pad 121 through communication between the control unit 70 disposed on the stop station 120 side and the control unit 71 disposed in the vehicle 110. Then, the control unit 70 stops the jet of liquid 101 by the foreign-matter-removing device 30 such that the liquid 101 does not reach the vehicle 110 before the vehicle 110 goes within a predetermined distance from the transmitting-side pad 121. Accordingly, according to the sixth embodiment, it is possible to prevent a foreign matter 100 jetted to fly by the liquid 101 and the hydraulic pressure from being attached to the vehicle 110. Even when a living thing is present on the transmitting-side pad 121, the living thing is allowed to escape by the jet of liquid 101 before the vehicle 110 comes close thereto.

Exemplary embodiments of the present disclosure have been described with reference to the drawings, but the present disclosure is not limited to the embodiments. All shapes, combinations, or the like of elements described in the above-mentioned embodiments are only examples and can be modified in various forms in response to design requests without departing from the main gist of the present disclosure.

For example, in the second embodiment, it is possible to improve collection efficiency of the liquid 101 by forming a height difference in the cover member 121b and setting the connection position of the liquid collection line 38 to be lowest.

For example, in the second embodiment, when the liquid collection tank 36 is disposed outdoors, it is possible to achieve saving of water charge and improvement in usability even in a place not provided with a water supply by opening the top of the liquid collection tank 36 and collecting rainwater or the like.

For example, in the third embodiment, a position of a foreign matter 100 is specified on the basis of induced currents from a plurality of detection coils 121a1, but the position-specifying unit 40 may be configured to specify the position of the foreign matter 100 on the basis of a weight, for example, in a state in which a plurality of weight sensors (strain sensors) are disposed in the facing surface 121A of the transmitting-side pad 121.

For example, in the sixth embodiment, the liquid 101 is not made to reach the vehicle 110, but the liquid 101 may not be made to reach a living body such as a person or an animal. For example, a configuration in which the stop station 120 is provided with living body-detecting means such as a camera, a smart entry key, or a sensor (of light or sound waves) and a jet of liquid 101 is started after it is confirmed that a living body is not present around the transmitting-side pad 121.

For example, in the above-mentioned embodiments, water supplied from a water supply is exemplified as the liquid 101, but the type of coolant is not limited as long as the coolant has non-magnetism and low electroconductivity. When this system is installed in a cold region, for example, an antifreezing solution such as ethylene glycol, a mixture of an antifreezing solution with water, or oil having a low freezing point may be used. When a coolant other than water is used, the liquid 101 can be effectively used by not draining the collected liquid in the second embodiment, removing waste or the like therefrom, and reusing the liquid.

For example, in the above-mentioned embodiments, power is supplied from the stop station 120 on the ground to the bottom of the vehicle 110, but the power supply direction is not limited. For example, power may be supplied from a wall to a side portion, a front portion, or a rear portion of the vehicle 110, or power may be supplied from a ceiling to the roof of the vehicle 110.

For example, in the above-mentioned embodiments, the power-receiving device is installed in the vehicle 110 and the power-transmitting device is installed in the stop station 120, but the present disclosure is not limited to this configuration. For example, the power-receiving device may be installed in the stop station 120 and the power-transmitting device may be installed in the vehicle 110.

In the above-mentioned embodiments, the transmitting-side pad 121 is disposed on the road surface 202, but the present disclosure is not limited to this configuration. For example, the transmitting-side pad 121 may be embedded such that the facing surface 121A is flush with the ground surface, or may be embedded such that the facing surface 121A is completely buried in the ground.

Figure 12A:
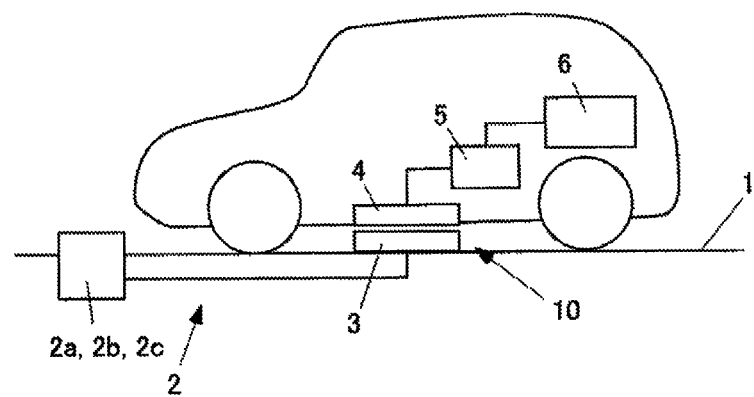
FIG. 12A is a diagram illustrating a configuration of a wireless power-supplying system including foreign matter detecting device according to the present disclosure.
Figure 12B:
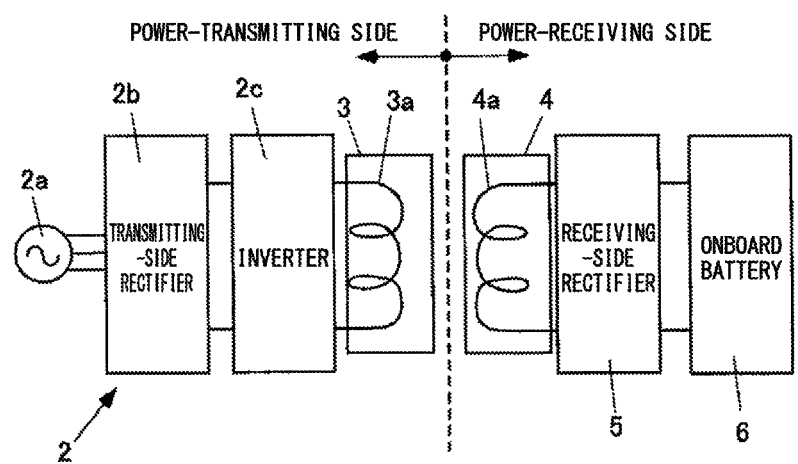
FIG. 12B is a diagram illustrating a configuration of the wireless power-supplying system including the foreign matter detecting device according to the present disclosure.

FIGS. 12A and 12B are diagrams illustrating a configuration of a wireless power-supplying system 2 including the foreign-matter-removing device 10 according to the present disclosure, where FIG. 12A illustrates a use state and FIG.

12B illustrates a block circuit diagram of the wireless power-supplying system 2. In the drawings, the wireless power-supplying system 2 supplies power from a transmitting-side pad 3 containing a power-transmitting coil 3a to a receiving-side pad 4 containing a power-receiving coil 4a in a wireless manner.

In FIGS. 12A and 12B, reference numeral 1 denotes a parking space, reference numeral 3 denotes a transmitting-side pad, reference numeral 4 denotes a receiving-side pad, reference numeral 5 denotes a receiving-side rectifier, and reference numeral 6 denotes an onboard battery.

The wireless power-supplying system 2 includes an AC power source 2a, a transmitting-side rectifier 2b, an inverter 2c, and a power-transmitting coil 3a and supplies power, which has been converted into high frequencies, to the power-transmitting coil 3a.

The power-transmitting coil 3a generates a high-frequency magnetic field using the supplied power. High-frequency power is generated in the power-receiving coil 4a due to the magnetic field. The power is converted into DC power by the receiving-side rectifier 5 and is charged in the onboard battery 6.

The foreign-matter-removing device 10 according to the present disclosure is a foreign-matter-removing device of the wireless power-supplying system 2.

Figure 13A:
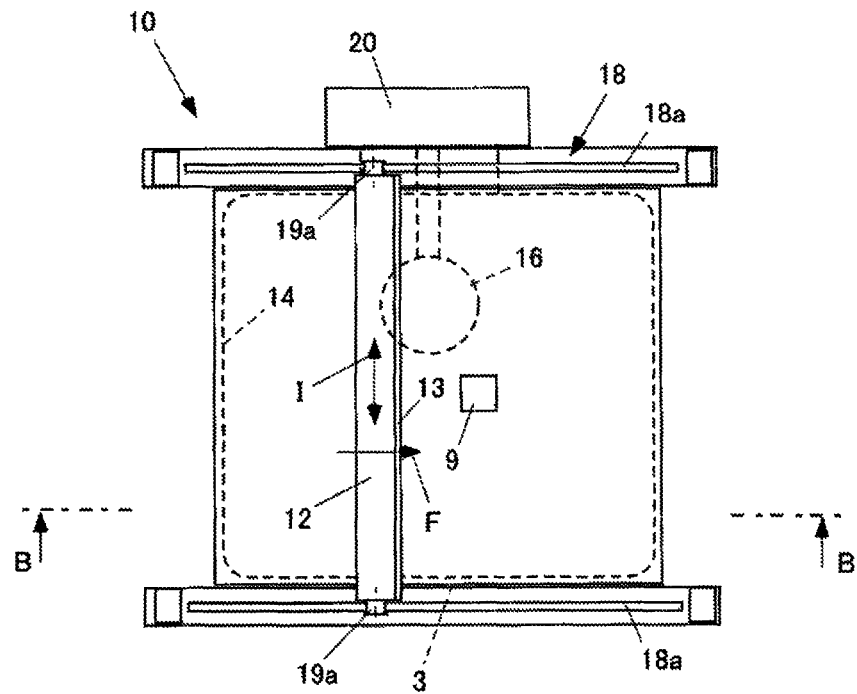
FIG. 13A is a diagram illustrating a foreign-matter-removing device according to a seventh embodiment of the present disclosure.
Figure 13B:
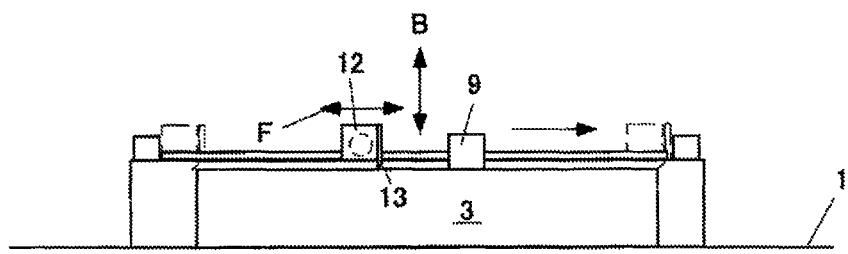
FIG. 13B is a diagram illustrating the foreign-matter-removing device according to the seventh embodiment of the present disclosure.

FIGS. 13A and 13B are diagrams illustrating a foreign-matter-removing device 10 according to a seventh embodiment of the present disclosure. In the drawings, FIG. 13A is a top view of the transmitting-side pad 3 and FIG. 13B is a cross-sectional view thereof when viewed in the direction of arrow B-B.

In FIGS. 13A and 13B, the foreign-matter-removing device 10 according to the present disclosure includes a wiper member 12, a ring-shaped coil 14, a guide unit 18, and a current supply control device 20.

The wiper member 12 is formed of an electroconductive material (such as aluminum or stainless steel) and is configured to be movable along the top surface of the transmitting-side pad 3 containing the power-transmitting coil 3a.

In this example, the wiper member 12 has a rod shape, extends horizontally over the top surface of the transmitting-side pad 3, and is configured to horizontally move forward and backward perpendicularly to the axis thereof.

A blade 13 that approaches or contacts the top surface of the transmitting-side pad 3 is attached to the wiper member 12. The blade 13 is a plastic or rubber sheet that has flexibility and ductility and moves while approaching or contacting the top surface of the transmitting-side pad 3.

In this example, the transmitting-side pad 3 has, for example, a rectangular shape of 50 cm×50 cm in a top view and has a thickness of 5 cm to 10 cm, and the top surface thereof is horizontal.

The ring-shaped coil 14 is one or more coils installed in the transmitting-side pad 3 and generates a single-phase alternating current on the basis of an alternating magnetic field of the power-transmitting coil 3a.

The ring-shaped coil 14 is selectively installed in an area in which a direction of a magnetic flux interlinking therewith is always constant. For example, in FIGS. 13A and 13B, the ring-shaped coil 14 has a rectangular shape surrounding the entire range of the transmitting-side pad 3. However, when the left half in FIGS. 13A and 13B interlinks with an upward magnetic flux from the drawing surface and the right half interlinks with a downward magnetic flux from the drawing surface, the ring-shaped coil 14 is configured to surround only one half. When a plurality of ring-shaped coils 14 are installed, the winding direction of the ring-shaped coils 14 is reversed to correspond to the direction of the interlinking magnetic flux and the direction of the induced current generated in the ring-shaped coils 14 is always constant. Depending on installation restrictions of the ring-shaped coil 14, the ring-shaped coil 14 may surround an area in which interlinking magnetic fluxes in the opposite directions are mixed through the acquired induced current decreases.

The guide unit 18 guides the wiper member 12 along the top surface of the transmitting-side pad 3. In this example, the guide unit 18 includes a linear driving guide 18a and a first current supply terminal 19a.

The linear driving guide 18a supports both ends of the wiper member 12 and guides forward and backward movement of both ends.

The first current supply terminal 19a is disposed at both ends of the wiper member 12 and supplies a single-phase alternating current in the axis direction of the wiper member 12.

Figure 14:
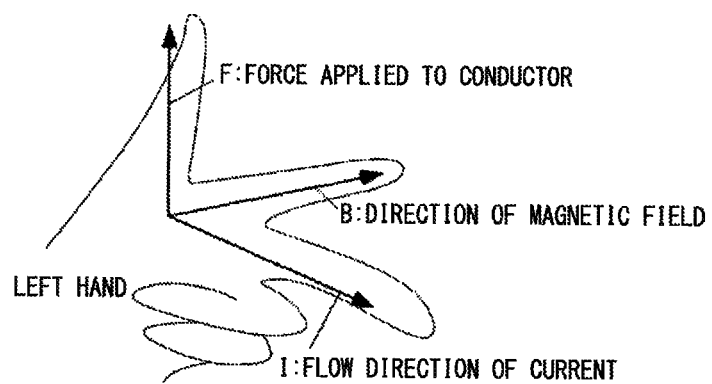
FIG. 14 is a principle diagram illustrating the Fleming's left hand rule.

FIG. 14 is a principle diagram illustrating Fleming's left hand rule.

As illustrated in the drawing, when a current I flows in a direction perpendicular to a magnetic flux density B, a force F acts in a direction perpendicular to the magnetic flux density B and the current I.

In this case, the force F per unit length can be calculated by the following equation:

$$F = I \times B \tag{1}$$

In the example illustrated in FIGS. 13A and 13B, the current I which is a single-phase alternating current generated in the ring-shaped coil 14 can be arbitrarily set by changing the number of ring-shaped coils and the number of turns thereof.

The magnetic flux density B in the transmitting-side pad 3 is, for example, equal to or less than 1 tesla.

Accordingly, a force F which is expressed by Equation (1) per unit length acts on the wiper member 12 along the top surface of the transmitting-side pad 3.

When the alternating magnetic field of the transmitting-side pad 3 has, for example, 100 kHz, the current I as a single-phase alternating current has the same frequency.

Accordingly, from the Fleming's left hand rule, the F acts on the wiper member 12 in only a single horizontal direction perpendicular to the axis thereof.

The current supply control device 20 directly supplies the single-phase alternating current generated in the ring-shaped coil 14 to the wiper member 12 to cause the wiper member 12 to move along the top surface of the transmitting-side pad 3.

Figure 15:
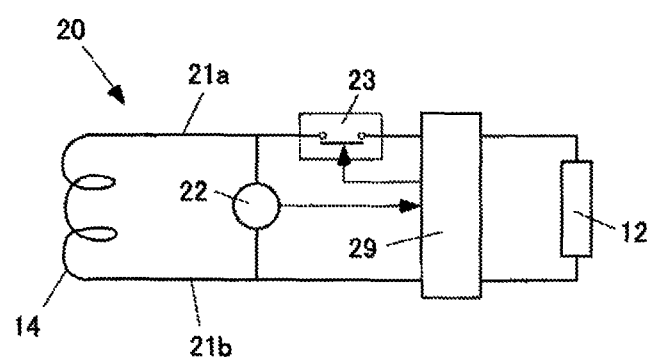
FIG. 15 is a diagram illustrating a current supply control device according to the seventh embodiment of the present disclosure.

FIG. 15 is a diagram illustrating a current supply control device 20 according to a seventh embodiment of the present disclosure.

In the drawing, the current supply control device 20 includes a pair of buses 21a and 21b, a detector 22, a contact 23, and a controller 29.

The pair of buses 21a and 21b connect the ring-shaped coil 14 and the wiper member 12 and supplies a single-phase alternating current generated in the ring-shaped coil 14 to the wiper member 12.

The detector 22 detects a voltage or impedance generated between the pair of buses 21a and 21b.

The contact 23 is preferably a relay contact point which is normally opened, is disposed in one or both of the buses 21a and 21b between the detector 22 and the wiper member 12, and is configured to disconnect the buses.

The controller 29 is, for example, a microcomputer, detects a foreign matter 9 on the top surface of the transmitting-side pad 3 on the basis of a variation in voltage or impedance detected by the detector 22, and switches the contact 23 from the open state to the closed state.

According to the above-mentioned configuration of the current supply control device 20, since a foreign matter 9 can be detected without using a foreign matter detector 16 to be described later in a state in which the contact 23 is opened (for example, normally opened), it is possible to reduce standby power consumption during charging.

When power is supplied to an electric vehicle or the like in a wireless manner, a charging time is long (for example, 6 hours to 8 hours). Accordingly, even after the electric vehicle stops and starts charging, it is preferable that a foreign matter be normally monitored and a detected foreign matter be removed.

On the other hand, since a frequency at which a foreign matter is interposed between the pads is generally low and the charging time is long, it is preferable that the standby power consumption during charging be small and a foreign matter be able to be removed without using a power source.

The wireless power-supplying system for a movable body disclosed in Patent Document 3 has, for example, a problem in that a power source of driving rollers for driving two wiper members is required.

The current supply control device 20 according to this embodiment generates a single-phase alternating current in the ring-shaped coil 14 due to an alternating magnetic field generated in the transmitting-side pad 3 at the time of wireless supply of power. Since the wiper member 12 is directly operated by the generated single-phase alternating current, it is possible to remove a foreign matter without using a power source.

The operation of the wiper member 12 by the current supply control device 20 is preferably limited to a time or a distance which is required for a foreign matter 9 on the sheet falls at one end and is preferably retreated to a position having a small magnetic flux density such that an eddy current is not generated in the wiper member to be more than necessary even when the contact 23 is in the open state.

According to this configuration, even when the charging time is long (for example, 6 hours to 8 hours), it is possible to shorten the operating time of the wiper member 12.

In this example, the current supply control device 20 supplies a current I, which is an alternating current and is synchronized with the transmitting-side pad 3, to the wiper member 12 to switch the current to an in-phase and a reversed phase. According to this configuration, it is possible to reverse the direction of the force F acting on the wiper member 12 and to cause the wiper member 12 to move forward and backward along the top surface of the transmitting-side pad 3.

This configuration is not essential and the switching to the in-phase and the reversed phase may be omitted and restoration may be carried out using a spring.

A rectifier circuit may be disposed between the ring-shaped coil 14 and the wiper member 12 to convert the AC current into a direct current. In this case, the wiper member 12 vibrates at the frequency of the alternating magnetic field of the transmitting-side pad 3.

A resonance circuit may be disposed in the current supply control device 20 to resonate with the alternating magnetic field of the transmitting-side pad 3. By using this resonance circuit, it is possible to generate a large current I even when the magnetic flux density B of the alternating magnetic field of the transmitting-side pad 3 is small.

In FIGS. 13A and 13B, the foreign-matter-removing device 10 according to the present disclosure additionally includes a foreign matter detector 16.

The foreign matter detector 16 is disposed in the transmitting-side pad 3 and detects a foreign matter 9 located on the top surface of the transmitting-side pad 3.

The foreign matter detector 16 is, for example, a magnetic probe and detects a foreign matter 9 on the basis of a variation in magnetic field in the transmitting-side pad 3. The foreign matter detector 16 is limited to this example, but may be, for example, a voltage detector or an impedance detector that detects a variation in voltage or impedance of the power-transmitting coil 3a or a thermistor that detects a variation in temperature due to emission of heat from the foreign matter 9.

Figure 16:
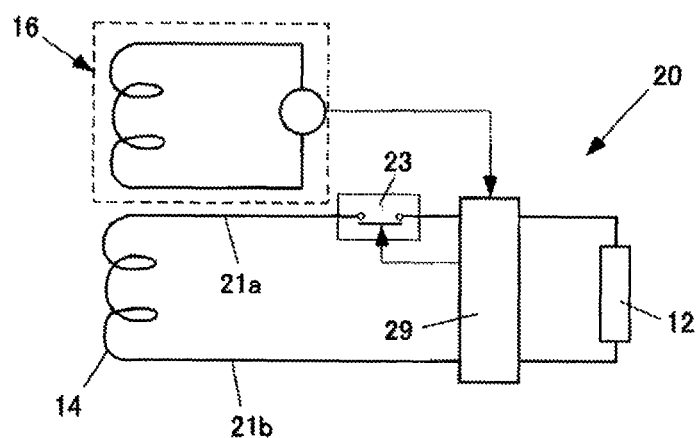
FIG. 16 is a diagram illustrating a current supply control device according to an eighth embodiment of the present disclosure.

FIG. 16 is a diagram illustrating a current supply control device 20 according to an eighth embodiment of the present disclosure.

In the drawing, the current supply control device 20 includes a pair of buses 21a and 21b, a contact 23, and a controller 29.

The detector 22 illustrated in FIG. 15 is omitted in this example.

The other configurations are the same as illustrated in FIG. 15.

According to the above-mentioned configuration of the current supply control device 20, since a foreign matter 9 can be detected using the foreign matter detector 16 in a state in which the contact 23 is opened (for example, normally opened), it is possible to reduce standby power consumption during charging. Since the dedicated foreign matter detector 16 is provided in addition to the ring-shaped coil 14, it is possible to enhance foreign matter detection accuracy.

Figure 17A:
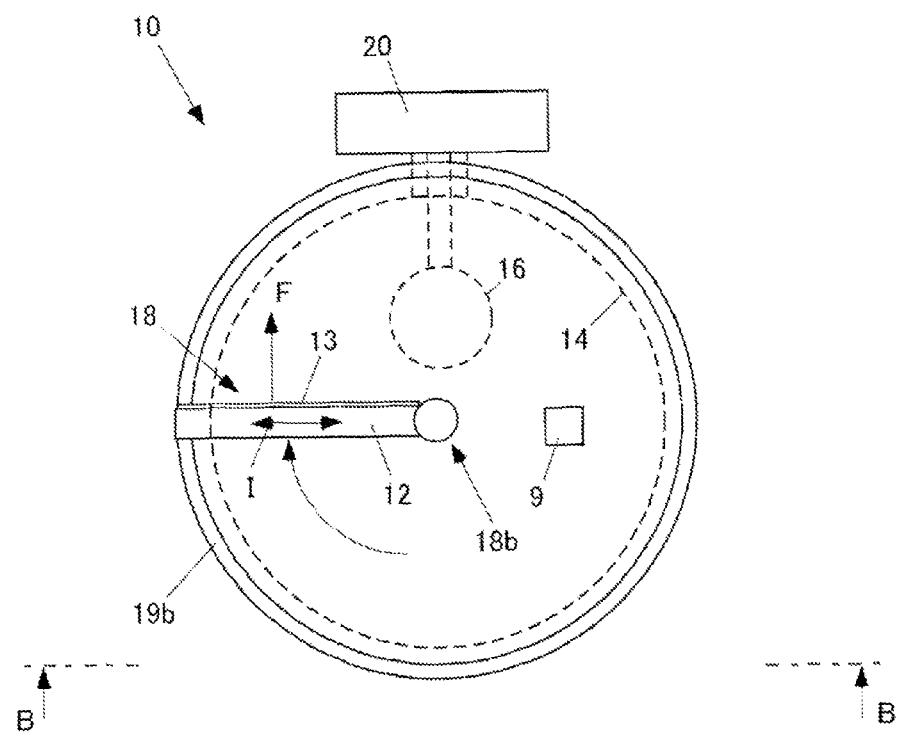
FIG. 17A is a diagram illustrating a foreign-matter-removing device according to the eighth embodiment of the present disclosure.
Figure 17B:
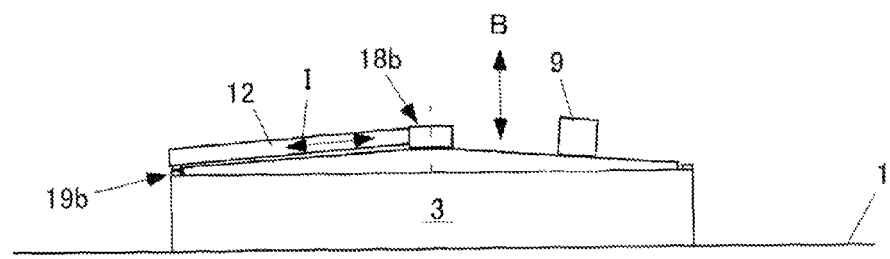
FIG. 17B is a diagram illustrating the foreign-matter-removing device according to the eighth embodiment of the present disclosure.

FIGS. 17A and 17B are diagrams illustrating a foreign-matter-removing device 10 according to the eighth embodiment of the present disclosure. In the drawings, FIG. 17A is a top view of the transmitting-side pad 3 and FIG. 17B is a cross-sectional view thereof when viewed from the direction of arrow B-B. In the drawings, the ring-shaped coil 14 has a circular shape, but may have a rectangular shape to correspond to a magnetic flux density distribution.

In FIGS. 17A and 17B, the top surface of the transmitting-side pad 3 has a truncated cone shape having a high center.

The wiper member 12 extends outward along a ridge of the truncated cone shape from the center of the transmitting-side pad 3 and is configuration to horizontally rotate about the center. The gradient of the ridge of the truncated cone shape is preferably set to an angle at which a foreign matter 9 can smoothly move outward.

The guide unit 18 includes a rotation guide 18b and a second current supply terminal 19b.

The rotation guide 18b rotatably supports the center of the wiper member 12 and guides the horizontal rotation of the wiper member 12.

The second current supply terminal 19b supplies a single-phase alternating current in the axis direction from both ends of the wiper member 12.

The other configurations are the same as in the eighth embodiment.

When the foreign matter detector 16 is not used, the configuration of the current supply control device 20 is the same as in the eighth embodiment illustrated in FIG. 15. When the foreign matter detector 16 is used, the configuration of the current supply control device 20 is the same as in the eighth embodiment illustrated in FIG. 16.

In this example, the switching to the in-phase and the reversed phase is not necessary.

According to the configuration illustrated in FIGS. 17A and 17B, a current can be supplied in the axis direction from both ends of the wiper member 12 via the second current supply terminal 19*b*. Accordingly, on the basis of the Fleming's left hand rule, a force F can be made to act on the wiper member 12 so as to cause the wiper member 12 to rotate in one direction along the top surface of the transmitting-side pad 3.

In this example, the wiper member 12 is a rod member that extends linearly in the radial direction. The rotation speed of the wiper member 12 may be arbitrarily set.

According to this configuration, since the top surface of the transmitting-side pad 3 has a truncated cone shape, it is possible to cause the foreign matter 9 to move outward along the inclination of the top surface and to fall to the outer end and to remove the foreign matter by causing the wiper member 12 to rotate along the top surface of the transmitting-side pad 3.

Figure 18A:
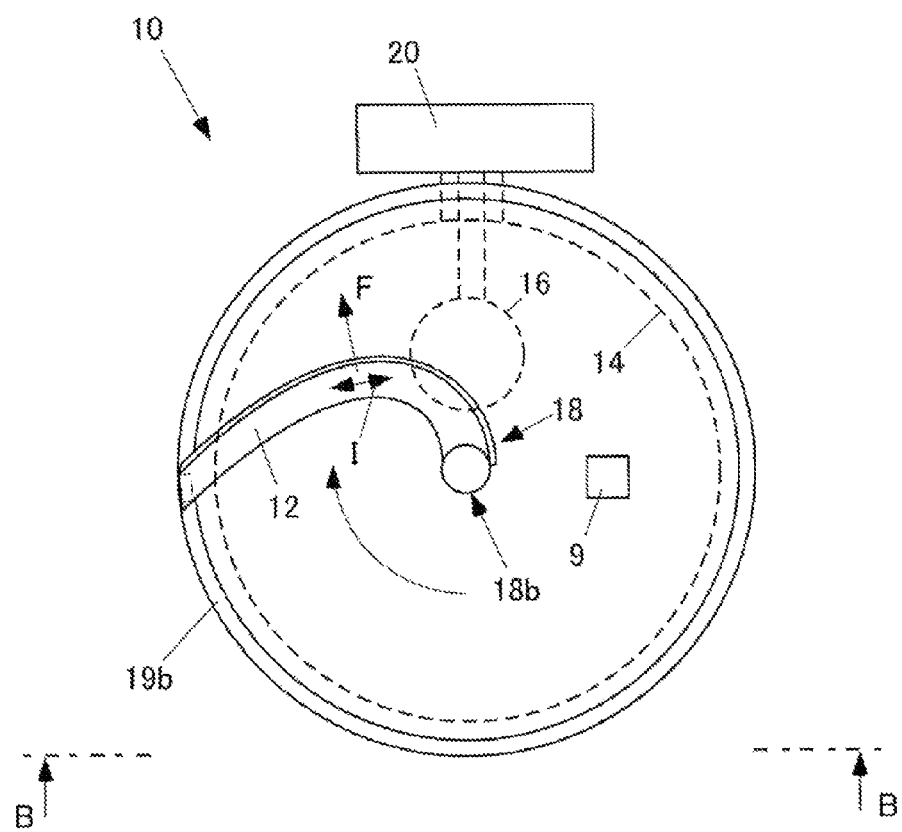
FIG. 18A is a diagram illustrating a foreign-matter-removing device according to a ninth embodiment of the present disclosure.
Figure 18B:
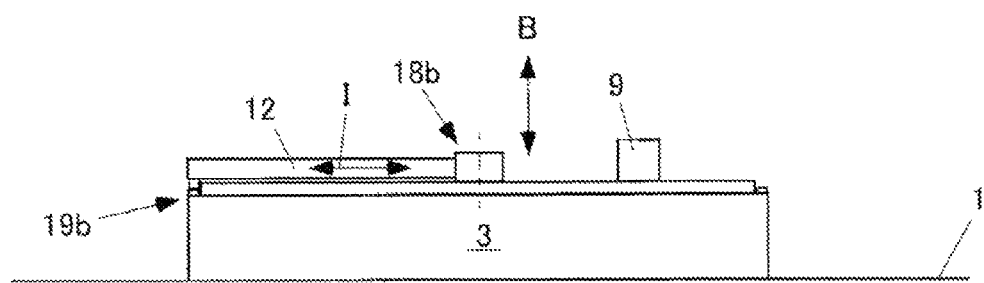
FIG. 18B is a diagram illustrating the foreign-matter-removing device according to the ninth embodiment of the present disclosure.

FIGS. 18A and 18B are diagrams illustrating a foreign-matter-removing device 10 according to a ninth embodiment of the present disclosure. In the drawings, FIG. 18A is a top view of the transmitting-side pad 3 and FIG. 18B is a cross-sectional view thereof when viewed from the direction of arrow B-B.

In FIGS. 18A and 18B, the top surface of the transmitting-side pad 3 is horizontal.

The wiper member 12 extends outward in a spiral shape along the top surface of the transmitting-side pad 3 from the center of the transmitting-side pad 3 and is configured to be horizontally rotatable about the center. The spiral shape is set such that a force F applied from the horizontally rotating wiper member 12 to a foreign matter 9 is directed to the outside.

The other configurations are the same as in the eighth embodiment.

According to the configuration illustrated in FIGS. 18A and 18B, a current can be supplied in the axis direction from both ends of the wiper member 12 via the second current supply terminal 19*b*. Accordingly, on the basis of the Fleming's left hand rule, a force F can be made to act on the wiper member 12 so as to cause the wiper member 12 to rotate in one direction along the top surface of the transmitting-side pad 3.

According to this configuration, since the spiral shape of the wiper member 12 is set such that the force F acting on the foreign matter 9 is directed to the outside, it is possible to cause the foreign matter 9 to move horizontally outward and to fall from the outer end and to remove the foreign matter, by rotating the wiper member 12.

According to the above-mentioned present disclosure, it is possible to generate a single-phase alternating current in the ring-shaped coil 14 due to an alternating magnetic field generated in the transmitting-side pad 3 in the wireless supply of power. By directly supplying the generated single-phase alternating current to the electroconductive wiper member 12, it is possible to cause the wiper member 12 to move along the top surface of the transmitting-side pad 3.

Accordingly, it is possible to remove a foreign matter without using a power source.

Figure 19A:
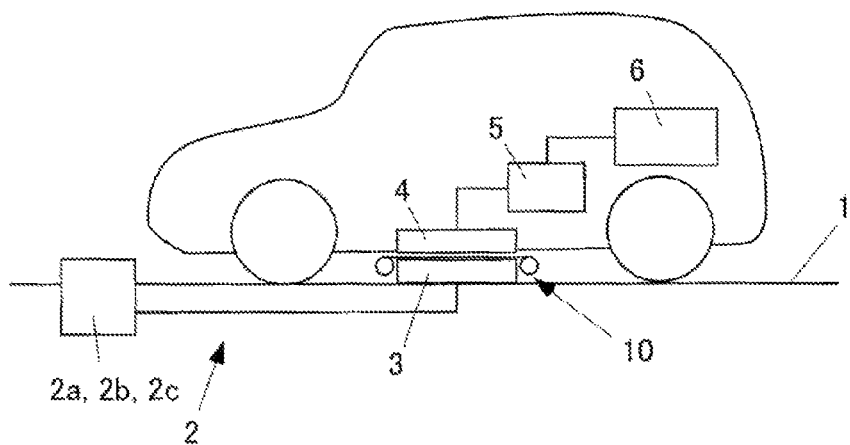
FIG. 19A is a diagram illustrating a configuration of a wireless power-supplying system including foreign matter detecting device according to the present disclosure.
Figure 19B:
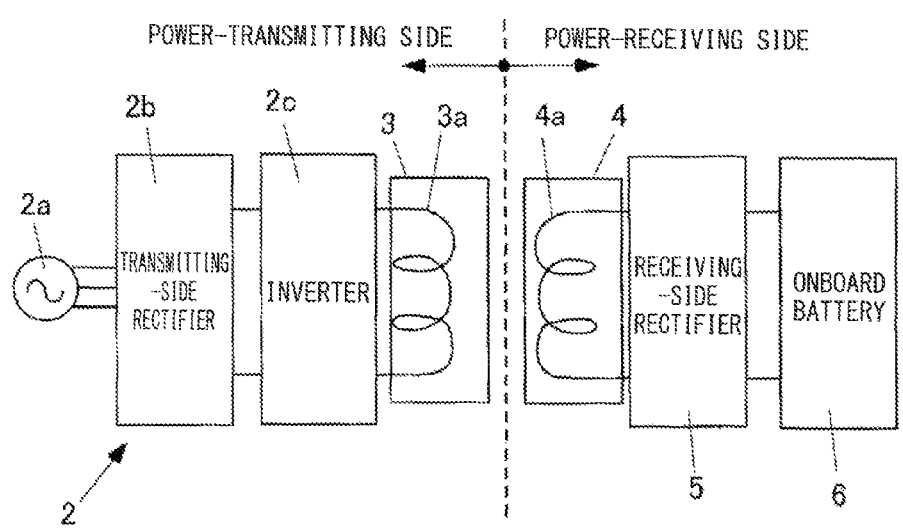
FIG. 19B is a diagram illustrating a configuration of the wireless power-supplying system including the foreign matter detecting device according to the present disclosure.

FIGS. 19A and 19B are diagrams illustrating a configuration of a wireless power-supplying system 2 including the foreign-matter-removing device 10 according to the present disclosure, where FIG. 19A illustrates a use state and FIG. 19B illustrates a block circuit diagram of the wireless power-supplying system 2.

In the drawings, the wireless power-supplying system 2 supplies power from a transmitting-side pad 3 containing a power-transmitting coil 3*a* to a receiving-side pad 4 containing a power-receiving coil 4*a* in a wireless manner.

In FIGS. 19A and 19B, reference numeral 1 denotes a parking space, reference numeral 3 denotes a transmitting-side pad, reference numeral 4 denotes a receiving-side pad, reference numeral 5 denotes a receiving-side rectifier, and reference numeral 6 denotes an onboard battery. The wireless power-supplying system 2 includes an AC power source 2*a*, a transmitting-side rectifier 2*b*, an inverter 2*c*, and a power-transmitting coil 3*a* and supplies power, which has been converted into high frequencies, to the power-transmitting coil 3*a*.

The power-transmitting coil 3*a* generates a high-frequency magnetic field using the supplied power. High-frequency power is generated in the power-receiving coil 4*a* due to the magnetic field. The power is converted into DC power by the receiving-side rectifier 5 and is charged in the onboard battery 6.

The foreign-matter-removing device 10 according to the present disclosure is a foreign-matter-removing device of the wireless power-supplying system 2.

Figure 20A:
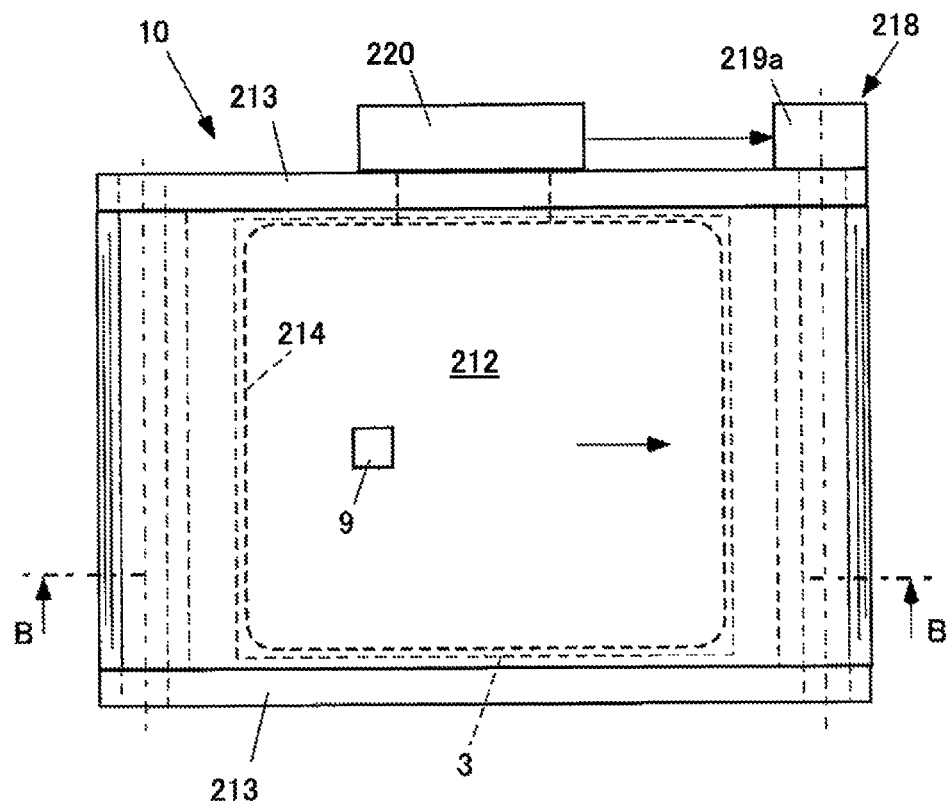
FIG. 20A is a diagram illustrating a foreign-matter-removing device according to a tenth embodiment of the present disclosure.
Figure 20B:
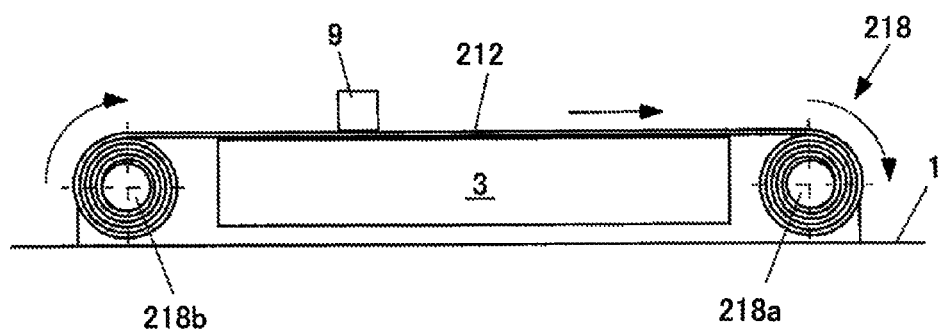
FIG. 20B is a diagram illustrating the foreign-matter-removing device according to the tenth embodiment of the present disclosure.

FIGS. 20A and 20B are diagrams illustrating a foreign-matter-removing device 10 according to a tenth embodiment of the present disclosure. In the drawings, FIG. 20A is a top view of the transmitting-side pad 3 and FIG. 20B is a cross-sectional view thereof when viewed in the direction of arrow B-B.

In FIGS. 20A and 20B, the foreign-matter-removing device 10 according to the present disclosure includes a sheet 212, a ring-shaped coil 214, a sheet-moving device 218, and a current supply control device 220.

The sheet 212 is formed of a flexible thin plate of a nonmagnetic material (such as a rubber sheet or a plastic sheet) and is configured to be movable along the top surface of the transmitting-side pad 3 containing the power-transmitting coil 3*a*.

Since the sheet 212 is formed of a nonmagnetic material, the sheet does not interfere with a high-frequency magnetic field which is generated between the power-transmitting coil 3*a* and the power-receiving coil 4*a*. Accordingly, the sheet 212 is located between the transmitting-side pad 3 and the receiving-side pad 4, but does not decrease efficiency of the wireless supply of power.

It is preferable that the sheet 212 have an adhesive material, concave-convex portions, corrugated grooves, or hooks on the surface thereof such that a foreign matter is not likely to slide well.

In this example, the transmitting-side pad 3 has, for example, a rectangular shape of 50 cm×50 cm in a top view and has a thickness of 5 cm to 10 cm, and the top surface thereof is horizontal. The top surface of the transmitting-side pad 3 is not limited to a horizontal shape but may be inclined or may be formed in a mountain shape.

The ring-shaped coil 214 is one or more coils installed in the transmitting-side pad 3 and generates a single-phase alternating current on the basis of an alternating magnetic field of the power-transmitting coil 3*a*.

The ring-shaped coil 214 is selectively installed in an area in which a direction of a magnetic flux interlinking therewith is always constant. For example, in FIGS. 20A and 20B, the ring-shaped coil 214 has a rectangular shape surrounding the entire range of the pad. However, when the left half in FIGS. 20A and 20B interlinks with an upward magnetic flux from the drawing surface and the right half interlinks with a downward magnetic flux from the drawing surface, the ring-shaped coil 214 is configured to surround only one half. When a plurality of ring-shaped coils 214 are installed, the winding direction of the ring-shaped coils 214 is reversed to correspond to the direction of the interlinking magnetic flux and the direction of the induced current generated in the ring-shaped coils 214 is always constant. Depending on installation restrictions of the ring-shaped coil 214, the ring-shaped coil 214 may surround an area in which interlinking magnetic fluxes in the opposite directions are partially mixed, though the acquired induced current decreases.

The number of ring-shaped coils 214 and the number of turns thereof are set, for example, such that power of the generated single-phase alternating current becomes the required power of the sheet-moving device 218, for example, ranges 100 Q to 1 KW.

The sheet-moving device 218 can be driven by the single-phase alternating current and causes the sheet 212 to move along the top surface of the transmitting-side pad 3.

In this example, the sheet-moving device 218 includes a forward winding roll 218a, a reverse winding roll 218b, and a forward winding motor 219a.

In FIGS. 20A and 20B, a main frame 213 of the sheet-moving device 218 is fixed to the top surface of the parking space 1, and the forward winding roll 218a and the reverse winding roll 218b are supported by both ends of the main frame 213 and are configured to be rotatable about the axes thereof.

The forward winding roll 218a is a cylindrical member extending in the width direction of the transmitting-side pad 3, is located outside one end of the transmitting-side pad 3, and is configured to wind the sheet 212 in a forward winding direction (the right winding direction in FIG. 20B).

The reverse winding roll 218b is a cylindrical member extending in the width direction of the transmitting-side pad 3, is located outside the other end of the transmitting-side pad 3, and is configured to wind the sheet 212 in a reverse winding direction (the left winding direction in FIG. 20B).

The forward winding roll 218a and the reverse winding roll 218b are preferably disposed to be parallel to each other.

The forward winding motor 219a is fixed to the main frame 213 and rotationally drives the forward winding roll 218a in the forward winding direction (the right winding direction in FIG. 20B) by the single-phase alternating current.

The forward winding motor 219a is preferably a reduction mechanism and is set to a speed (for example, 0.1 m/s to 1.0 m/s) at which a foreign matter 9 can move on the sheet without sliding. The forward winding motor 219a may be a single-phase motor that can be directly driven using the single-phase alternating current generated in the ring-shaped coil 214, may be a DC motor that is driven using a direct current which is acquired by rectifying the single-phase alternating current generated in the ring-shaped coil 214 using a rectifier such as a diode bridge, or may be a three-phase induction motor or a three-phase synchronous motor that is driven using a three-phase alternating current which is acquired by rectifying the single-phase alternating current generated in the ring-shaped coil 214 and additionally converting the rectified current using an inverter. Various motors can be used.

According to the above-mentioned configuration, by rotationally driving the forward winding motor 219a in the forward winding direction with a single-phase alternating current, the sheet 212 can be made to move along the top surface of the transmitting-side pad 3, to cause a foreign matter 9 on the sheet to fall to one end (the right end in FIG. 20B), and to remove the foreign matter.

The current supply control device 220 supplies the single-phase alternating current generated in the ring-shaped coil 214 to the sheet-moving device 218 to control the sheet-moving device 218.

Figure 21:
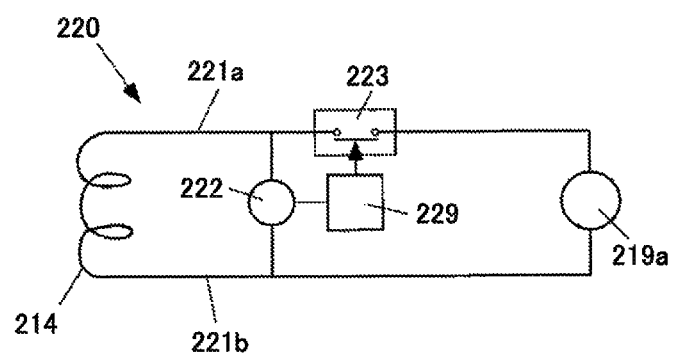
FIG. 21 is a diagram illustrating a current supply control device according to the tenth embodiment of the present disclosure.

FIG. 21 is a diagram illustrating a current supply control device 20 according to the tenth embodiment of the present disclosure. In the drawings, the current supply control device 220 includes a pair of buses 221a and 221b, a first detector 222, a first contact 223, and a controller 229.

The pair of buses 221a and 221b connect the ring-shaped coil 214 and the forward winding motor 219a and supplies the single-phase current generated in the ring-shaped coil 214 to the forward winding motor 219a. In this example, the ring-shaped coil 214 and the forward winding motor 219a are directly connected to each other via the buses 221a and 221b, but a transformer or a rectifier circuit may be disposed therebetween to perform conversion of a voltage, conversion into a three-phase alternating current, or conversion into a direct current.

The first detector 222 detects a voltage or impedance which is generated between the pair of buses 221a and 221b.

The first contact 223 is preferably a relay contact point which is normally opened, is disposed in one or both of the buses 221a and 221b between the first detector 222 and the forward winding motor 219a, and is configured to disconnect a connection therebetween.

The controller 229 is, for example, a microcomputer, detects a foreign matter 9 on the top surface of the transmitting-side pad 3 on the basis of a variation in voltage or impedance detected by the first detector 222, and switches the first contact 223 from the open state to the closed state.

Power which is used to drive the controller 229 can be acquired from the single-phase alternating current generated in the ring-shaped coil 214 using a rectifier circuit such as a diode bridge or a voltage conversion circuit such as an up-converter or a down-converter. The ring-shaped coil 214 for acquiring the power for driving the forward winding motor 219a and the ring-shaped coil 214 for acquiring the power for driving the controller 229 may be equal to or different from each other. The power for driving a foreign matter detector 216 or the current supply control device 220 to be described later may be acquired in the same way as acquiring the power for driving the controller 229.

According to the above-mentioned configuration of the current supply control device 220, since a foreign matter 9 can be detected without using a foreign matter detector 216 to be described later in a state in which the first contact 223 is opened (for example, normally opened), it is possible to reduce standby power consumption during charging.

When power is supplied to an electric vehicle or the like in a wireless manner, a charging time is long (for example, 6 hours to 8 hours). Accordingly, even after the electric vehicle stops and starts charging, it is preferable that a foreign matter be normally monitored and a detected a foreign matter be removed.

On the other hand, since a frequency at which a foreign matter is interposed between the pads is generally low and the charging time is long, it is preferable that the standby power consumption during charging be small and a foreign matter be able to be removed without using a power source.

The wireless power-supplying system for a movable body disclosed in Patent Document 3 has, for example, a problem in that a power source of driving rollers for driving a belt conveyor is required.

The current supply control device 220 according to this embodiment generates a single-phase alternating current in the ring-shaped coil 214 due to an alternating magnetic field generated in the transmitting-side pad 3 at the time of wireless supply of power. Since the sheet-moving device 218 is directly operated by the generated single-phase alternating current, it is possible to remove a foreign matter without using a power source.

The operation of the sheet-moving device 218 by the current supply control device 220 is preferably limited to a time or a distance which is required for a foreign matter 9 on the sheet falls at one end.

According to this configuration, even when the charging time is long (for example, 6 hours to 8 hours), it is possible to shorten the moving time or distance of the sheet 212.

In this example, the sheet 212 wound around the forward winding roll 218a is wound by manually rotating the reverse winding roll 218b in the reverse winding direction. According to this configuration, a reverse winding motor (a reverse winding motor 219b to be described later) having a low use frequency can be omitted.

Figure 22A:
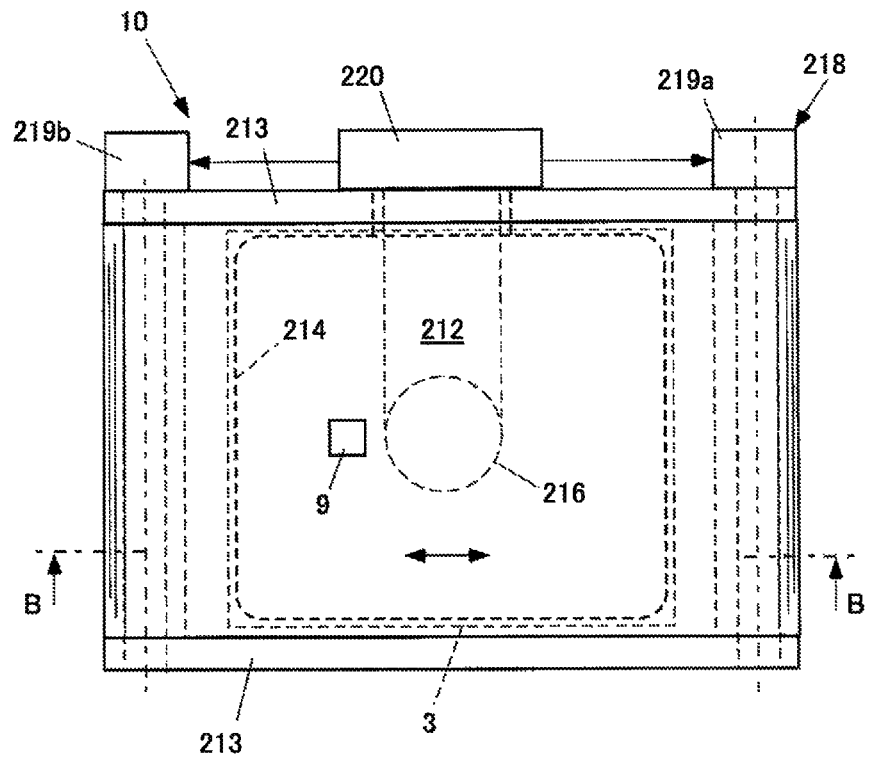
FIG. 22A is a diagram illustrating a foreign-matter-removing device according to an eleventh embodiment of the present disclosure.
Figure 22B:
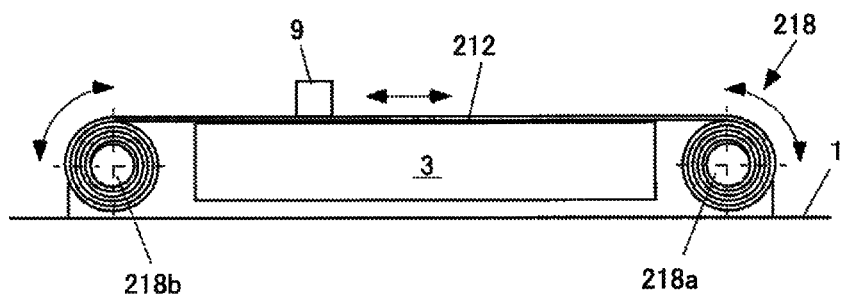
FIG. 22B is a diagram illustrating the foreign-matter-removing device according to the eleventh embodiment of the present disclosure.

FIGS. 22A and 22B are diagrams illustrating a foreign-matter-removing device 10 according to an eleventh embodiment of the present disclosure. In the drawings, the foreign-matter-removing device 10 according to the present disclosure additionally includes a foreign matter detector 216 and a reverse winding motor 219b.

The foreign matter detector 216 is disposed in the transmitting-side pad 3 and detects a foreign matter 9 located on the top surface of the transmitting-side pad 3.

The foreign matter detector 216 is, for example, a magnetic probe and detects a foreign matter 9 on the basis of a variation in magnetic field in the transmitting-side pad 3. The foreign matter detector 216 is limited to this example, but may be, for example, a voltage detector or an impedance detector that detects a variation in voltage or impedance of the power-transmitting coil 3a or a thermistor that detects a variation in temperature due to emission of heat from the foreign matter 9.

The reverse winding motor 219b rotationally drives the reverse winding roll 218b in the reverse winding direction using the single-phase alternating current. Similarly to the forward winding motor 219a, various motors such as a single-phase motor, a DC motor, a three-phase induction motor, and a three-phase synchronous motor can be used as the reverse winding motor 219b.

Figure 23:
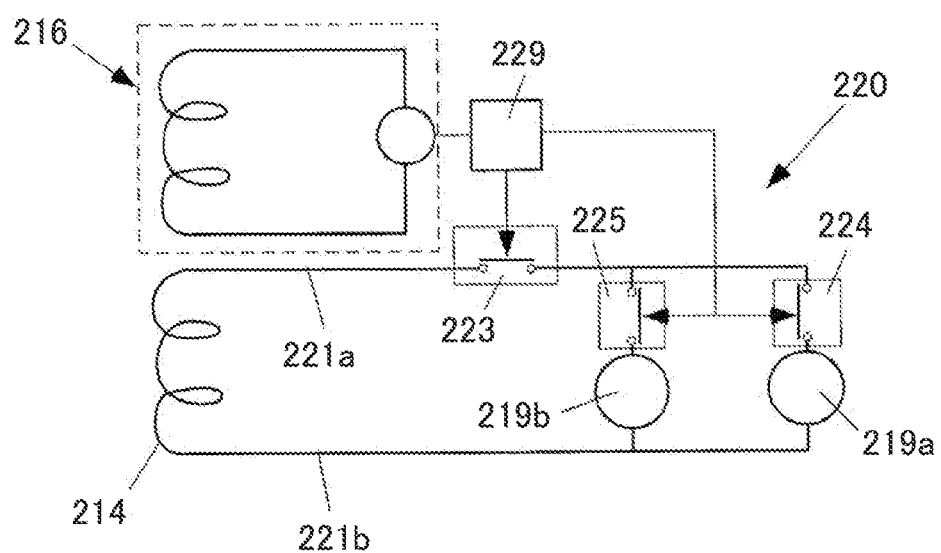
FIG. 23 is a diagram illustrating a current supply control device according to the eleventh embodiment of the present disclosure.

FIG. 23 is a diagram illustrating a current supply control device 220 according to the eleventh embodiment of the present disclosure. In the drawing, the current supply control device 220 includes a pair of buses 221a and 221b, a first contact 223, a second contact 224, a third contact 225, and a controller 229.

The first detector 222 in FIG. 21 is omitted in this example.

The pair of buses 221a and 221b connect the ring-shaped coil 214 to the forward winding motor 219a and the reverse winding motor 219b and supplies the single-phase current generated in the ring-shaped coil 214 to the forward winding motor 219a and the reverse winding motor 219b.

The second contact 224 is preferably a relay contact point, is disposed in one or both of power lines for supplying power to the forward winding motor 219a from the buses 221a and 221b, and is configured to disconnect a connection therebetween.

The third contact 225 is preferably a relay contact point, is disposed in one or both of power lines for supplying power to the reverse winding motor 219b from the buses 221a and 221b, and is configured to disconnect a connection therebetween.

The controller 229 is realized, for example, by a microcomputer and a memory storing programs, and switches the first contact 223 from the open state to the closed state to operate the sheet-moving device 218 when a foreign matter 9 is detected by the foreign matter detector 216.

The controller 229 is alternately turns on/off the second contact 224 and the third contact 225 to alternately rotationally drive the forward winding motor 219a and the reverse winding motor 219b.

The other configurations are the same as illustrated in FIGS. 20A, 20B, 21A, and 21B.

According to the above-mentioned configuration of the current supply control device 220, since a foreign matter 9 can be detected using the foreign matter detector 216 in a state in which the first contact 223 is opened (for example, normally opened), it is possible to reduce standby power consumption during charging. Since the sheet-moving device 218 is operated using the single-phase alternating current generated in the ring-shaped coil 214, it is possible to remove a foreign matter without using a power source.

Since a dedicated foreign matter detector 216 is provided in addition to the ring-shaped coil 214, it is possible to enhance accuracy of foreign matter detection in the foreign matter detector 216.

In this example, the sheet 212 wound around the forward winding roll 218a can be wound around the reverse winding roll 218b by the reverse winding motor 219b.

The present disclosure is not limited to the above-mentioned examples, but the entire sheet may be rewound using the reverse winding motor 219b after the entire sheet is wound using the forward winding motor 219a.

On the other hand, the forward winding motor 219a and the reverse winding motor 219b may be alternately rotationally driven for a short time to cause the sheet 212 to vibrate and a foreign matter 9 may be moved and removed with the vibration.

Figure 24A:
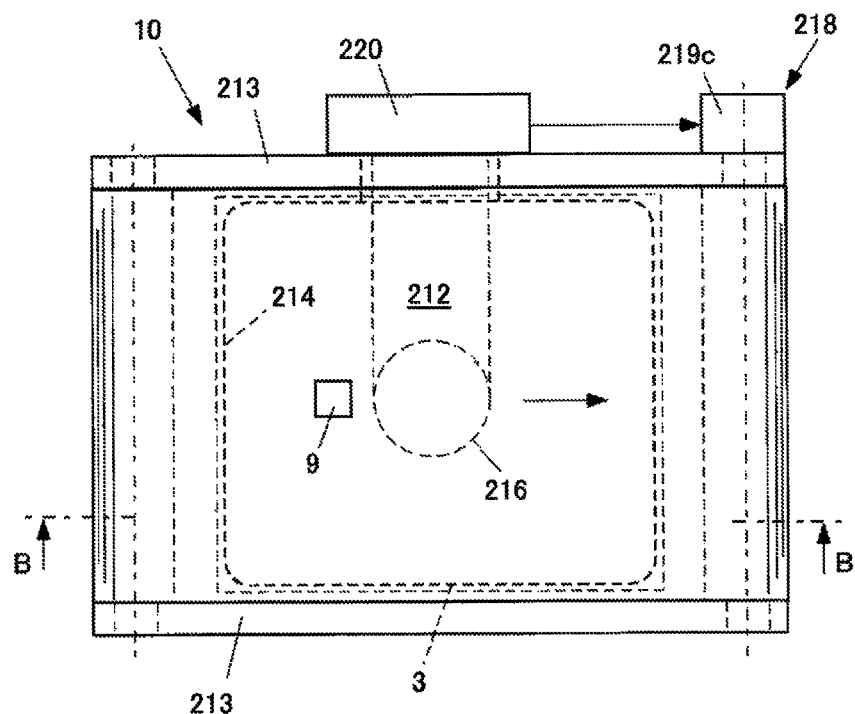
FIG. 24A is a diagram illustrating a foreign-matter-removing device according to a twelfth embodiment of the present disclosure.
Figure 24B:
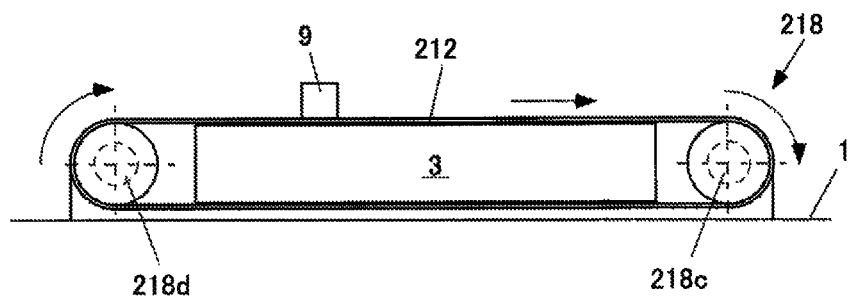
FIG. 24B is a diagram illustrating the foreign-matter-removing device according to the twelfth embodiment of the present disclosure.

FIGS. 24A and 24B are diagrams illustrating a foreign-matter-removing device 10 according to a twelfth embodiment of the present disclosure.

In the drawings, the foreign-matter-removing device 10 according to the present disclosure includes a downstream roll 218c, an upstream roll 218d, and a driving motor 219c.

The downstream roll 218c is a cylindrical member extending in the width direction of the transmitting-side pad 3 and is located outside one end of the transmitting-side pad 3.

The upstream roll 218d is a cylindrical member extending in the width direction of the transmitting-side pad 3 and is located outside the other end of the transmitting-side pad 3.

The driving motor 219c rotationally drives the downstream roll 218c or the upstream roll 218d using a single-phase alternating current. The driving motor 219c may be the same as the forward winding motor 219a or the reverse winding motor 219b which has been described above.

In this example, the sheet 212 is suspended between the downstream roll 218c and the upstream roll 218d in an endless manner.

The other configurations are the same as in the tenth embodiment.

Figure 25A:
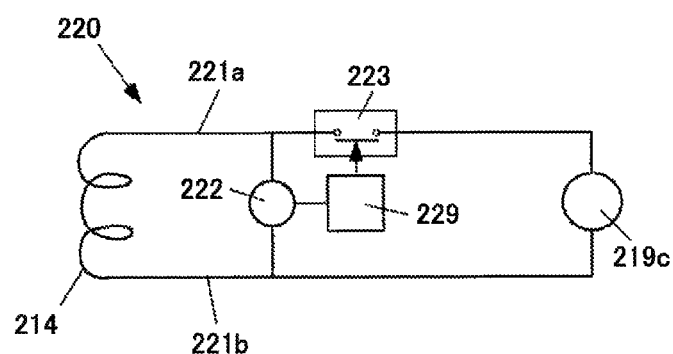
FIG. 25A is a diagram illustrating a current supply control device according to the twelfth embodiment of the present disclosure.
Figure 25B:
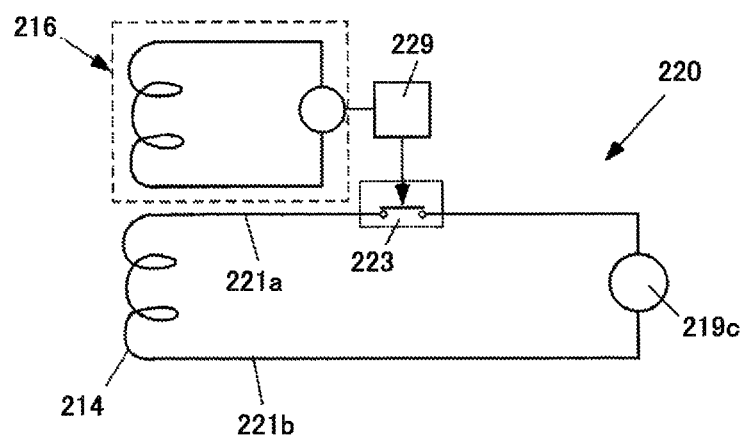
FIG. 25B is a diagram illustrating the current supply control device according to the twelfth embodiment of the present disclosure.

FIGS. 25A and 25B are diagrams illustrating a current supply control device 220 according to the twelfth embodiment of the present disclosure. In the drawings, FIG. 25A corresponds to a case in which the foreign matter detector 216 is not used, and FIG. 25B corresponds to a case in which the foreign matter detector 216 is used.

FIG. 25A illustrates a configuration in which the forward winding motor 219a illustrated in FIG. 21 (the tenth embodiment) is replaced with the driving motor 219c, and the other configurations are the same.

FIG. 25B illustrates a configuration in which the forward winding motor 219a illustrated in FIG. 23 (the eleventh embodiment) is replaced with the driving motor 219c, and the reverse winding motor 219b, the second contact 224, and the third contact 225 are omitted, and the other configurations are the same.

According to the configurations illustrated in FIGS. 25A and 25B, by rotationally driving the driving motor 219c in the clockwise direction in the drawings using a single-phase alternating current, the sheet 212 can be made to move along the top surface of the transmitting-side pad 3 in an endless manner to cause a foreign matter 9 on the sheet to fall to one end (the right side in the drawings) and to remove the foreign matter.

In this configuration, since the sheet 212 rotates in an endless manner, it is not necessary to rewind the sheet 212 unlike the tenth embodiment.

According to the above-mentioned present disclosure, it is possible to generate a single-phase alternating current in the ring-shaped coil 214 due to an alternating magnetic field generated in the transmitting-side pad in the wireless supply of power and to drive the sheet-moving device 218 using the single-phase alternating current.

Accordingly, even when a foreign matter 9 is interposed between the pads after a vehicle to be supplied with power in a wireless manner stops, it is possible to remove a foreign matter without using a power source.

Figure 26:
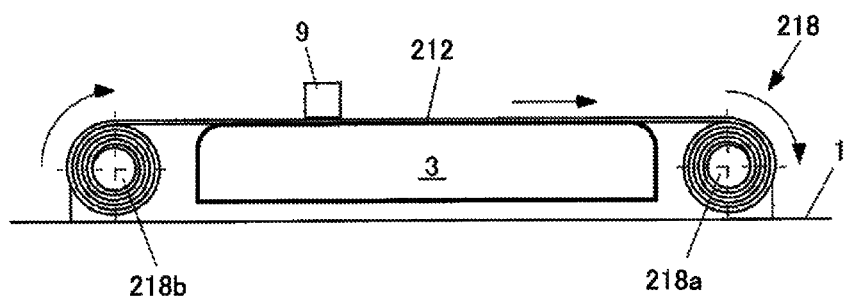
FIG. 26 is a diagram illustrating a current supply control device according to a thirteenth embodiment of the present disclosure.

FIG. 26 is a diagram illustrating a current supply control device 220 according to a thirteenth embodiment of the present disclosure. This drawing is different from FIG. 20B, in only the shape of the transmitting-side pad 3. The configuration other than the shape of the transmitting-side pad 3 may the same as the other embodiments.

As illustrated in FIG. 26, by rounding corners of positions of the transmitting-side pad 3 at which the sheet 212 goes into and from, it is possible to cause the sheet 212 to smoothly move even when the sheet 212 is warped due to a weight of the foreign matter 9 or the like.

Figure 27:
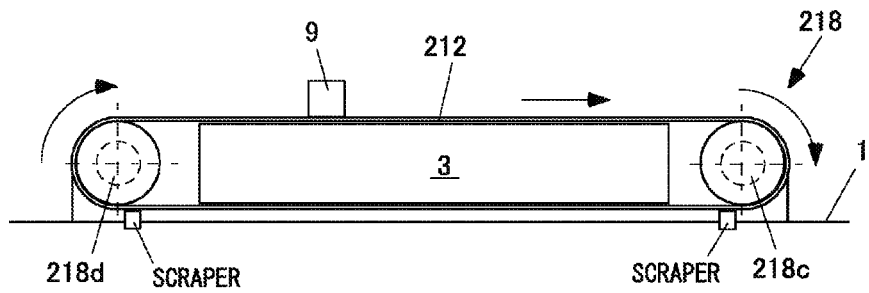
FIG. 27 is a diagram illustrating a current supply control device according to a fourteenth embodiment of the present disclosure.

FIG. 27 is a diagram illustrating a current supply control device 220 according to a fourteenth embodiment of the present disclosure. This drawing is different from FIG. 24B in only a scraper.

By pressing a scraper formed of, for example, resin or rubber having elasticity against the sheet 212 to scrape out a foreign matter, it is possible to more satisfactorily remove the foreign matter having viscosity. As illustrated in FIG. 27, by disposing the scraper at a position at which the surface of the sheet 212 faces a downside or an oblique downside, the foreign matter scraped out by the scraper drops to be separated from the sheet 212 by the gravity thereof, which is particularly effective.

The present disclosure is not limited to the above-mentioned embodiments, but is represented by the appended claims and includes all modifications within meanings and scopes equivalent to the claims. The present disclosure is not limited to the magnetic resonance system, but may employ other systems such as an electromagnetic induction system.

INDUSTRIAL APPLICABILITY

According to the present disclosure, it is possible to provide a foreign-matter-removing device which can remove a foreign matter, a ground equipment of a wireless power-supplying system, and a wireless power-supplying system.

The invention claimed is:

1. A foreign-matter-removing device for a wireless power-supplying system that supplies power from a power-transmitting coil to a power-receiving coil in a wireless manner, the foreign-matter-removing device comprising:
a flexible sheet that is movable along a top surface of a transmitting-side pad containing the power-transmitting coil;
a ring-shaped coil that is disposed in the transmitting-side pad and generates a single-phase alternating current from an alternating magnetic field of the power-transmitting coil;
a sheet-moving device that is driven by a single-phase alternating current and moves the sheet along the top surface of the transmitting-side pad; and
a current supply control device that supplies the single-phase alternating current generated in the ring-shaped coil to the sheet-moving device and controls the sheet-moving device.

2. The foreign-matter-removing device for a wireless power-supplying system according to claim 1, further comprising a foreign matter detector that detects a foreign matter located on the top surface of the transmitting-side pad,
wherein the current supply control device causes the sheet-moving device to operate when the foreign matter is detected by the foreign matter detector.

3. The foreign-matter-removing device for a wireless power-supplying system according to claim 2, wherein the foreign matter detector detects a variation in voltage or impedance of the power-transmitting coil, a variation in a magnetic field in the transmitting-side pad, or a variation in temperature due to emission of heat from the foreign matter.

4. The foreign-matter-removing device for a wireless power-supplying system according to claim 1, wherein the sheet-moving device includes:
a forward winding roll that is located outside one end of the transmitting-side pad and winds the sheet in a forward winding direction;
a reverse winding roll that is located outside the other end of the transmitting-side pad and winds the sheet in a reverse winding direction; and
a forward winding motor that rotationally drives the forward winding roll in the forward winding direction with the single-phase alternating current.

5. The foreign-matter-removing device for a wireless power-supplying system according to claim 4, further comprising a reverse winding motor that rotationally drives the reverse winding roll in the reverse winding direction with the single-phase alternating current,
wherein the current supply control device alternately rotationally drives the forward winding motor and the reverse winding motor.

6. The foreign-matter-removing device for a wireless power-supplying system according to claim 1, wherein the sheet-moving device includes:
a downstream roll that is located outside one end of the transmitting-side pad;
an upstream roll that is located outside the other end of the transmitting-side pad; and
a driving motor that rotationally drives the downstream roll or the upstream roll with the single-phase alternating current, and
the sheet is spanned between the downstream roll and the upstream roll in an endless manner.

7. The foreign-matter-removing device for a wireless power-supplying system according to claim 1, wherein the sheet has an adhesive matter, concave-convex portions, corrugated grooves, or hooks on a surface thereof such that the foreign matter hardly slides.

\* \* \* \* \*